(12) United States Patent
Soto et al.

(10) Patent No.: US 9,924,753 B1
(45) Date of Patent: Mar. 27, 2018

(54) HELMET ATTACHMENT DEVICE

(71) Applicant: Norotos, Inc., Santa Ana, CA (US)

(72) Inventors: Ronald R. Soto, Santa Ana, CA (US); Jonathon R. Prendergast, Newport Beach, CA (US)

(73) Assignee: Norotos, Inc., Santa Ana, CA (US)

( * ) Notice: Subject to any disclaimer, the term of this patent is extended or adjusted under 35 U.S.C. 154(b) by 0 days.

(21) Appl. No.: 15/426,936

(22) Filed: Feb. 7, 2017

(51) Int. Cl.
*A42B 3/04* (2006.01)
*F16B 2/10* (2006.01)
*F16B 2/18* (2006.01)
*G02B 7/00* (2006.01)

(52) U.S. Cl.
CPC .............. *A42B 3/0406* (2013.01); *F16B 2/10* (2013.01); *F16B 2/18* (2013.01); *G02B 7/002* (2013.01)

(58) Field of Classification Search
CPC . A42B 3/0406; F16B 2/18; F16B 2/10; G02B 7/002; Y10T 24/3449; Y10T 24/4755; Y10T 24/45314
USPC ........ 248/636, 288.11, 298.1, 316.2, 223.11, 248/231.31, 229.11, 229.13, 689, 181; 24/3.12, 67.5, 457; 2/6.2
See application file for complete search history.

(56) References Cited

U.S. PATENT DOCUMENTS

| | | | | |
|---|---|---|---|---|
| 265,747 A | * | 10/1882 | Briggs | B62K 25/02 285/88 |
| 327,282 A | * | 9/1885 | Levett | B62K 25/02 24/134 R |
| 1,190,446 A | * | 7/1916 | Moore | A41B 3/08 24/3.13 |
| 2,463,451 A | * | 3/1949 | Yates | A47G 25/0657 24/67 R |
| 2007/0120021 A1 | * | 5/2007 | Lin | F16B 2/18 248/49 |

* cited by examiner

*Primary Examiner* — Jack W Lavinder
(74) *Attorney, Agent, or Firm* — Lewis Roca Rothgerber Christie LLP; Thomas J. Daly

(57) ABSTRACT

A helmet attachment device includes an attachment device for a helmet, the attachment device comprising a clamp including means forming a "u" shaped lower section for receiving a portion of the helmet, wherein the clamp includes an exterior; and a cam pivotally mounted to the clamp for movement between a released and clamped position to respectively disengage and engage the attachment device to the helmet.

9 Claims, 25 Drawing Sheets

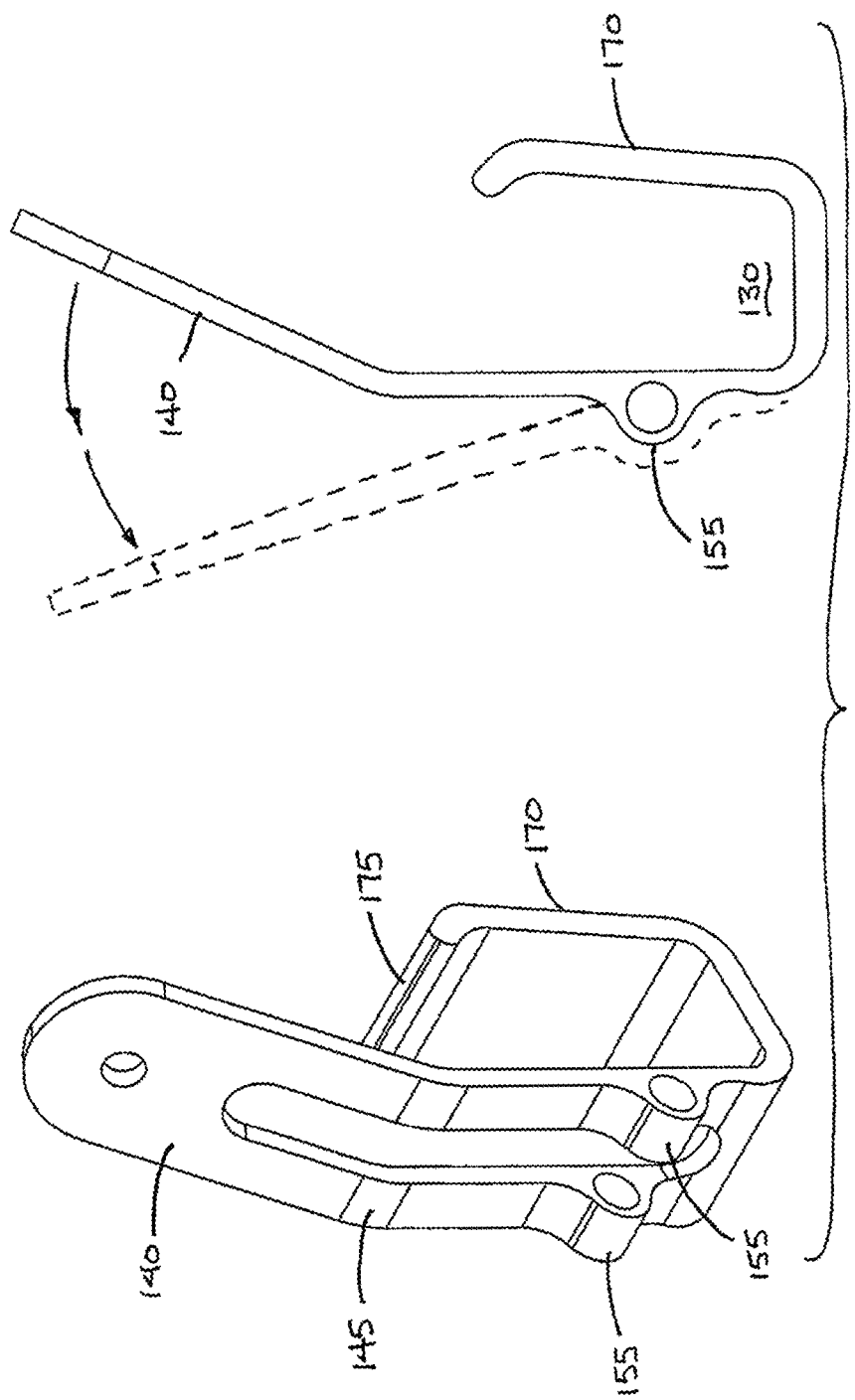

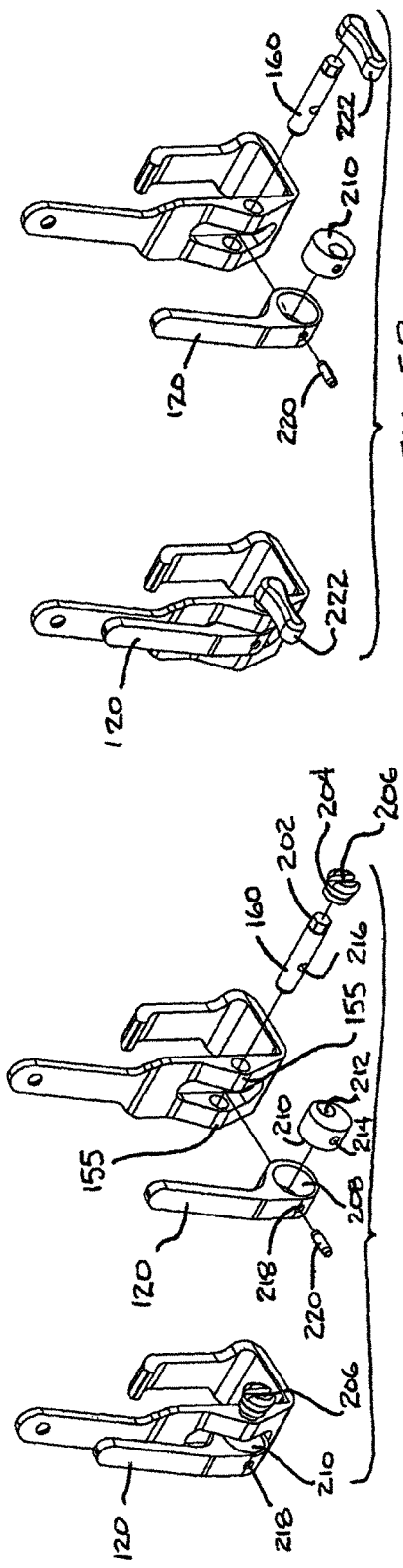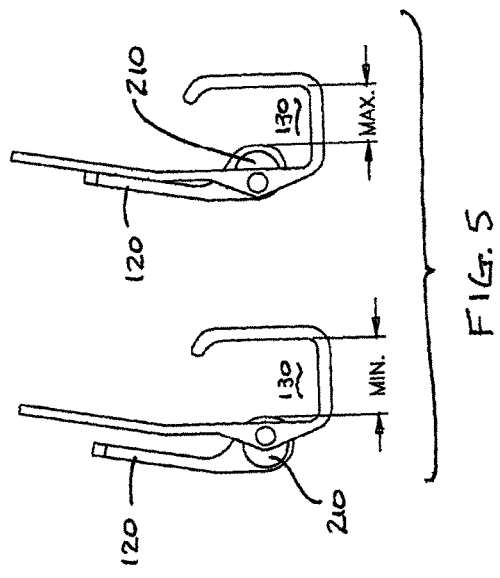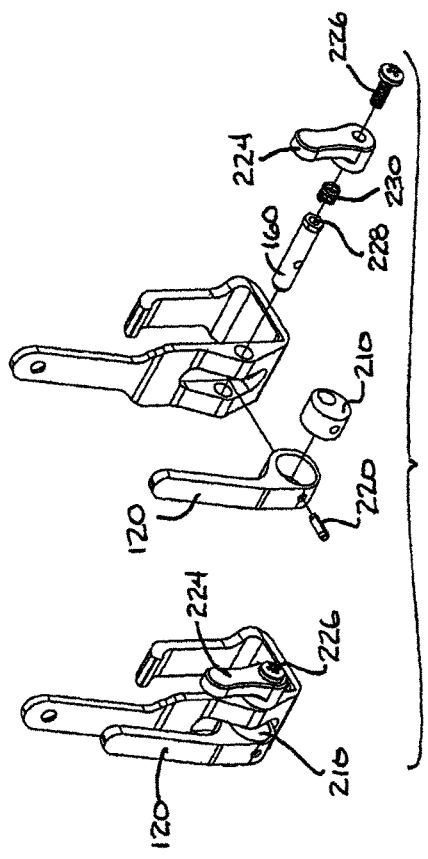

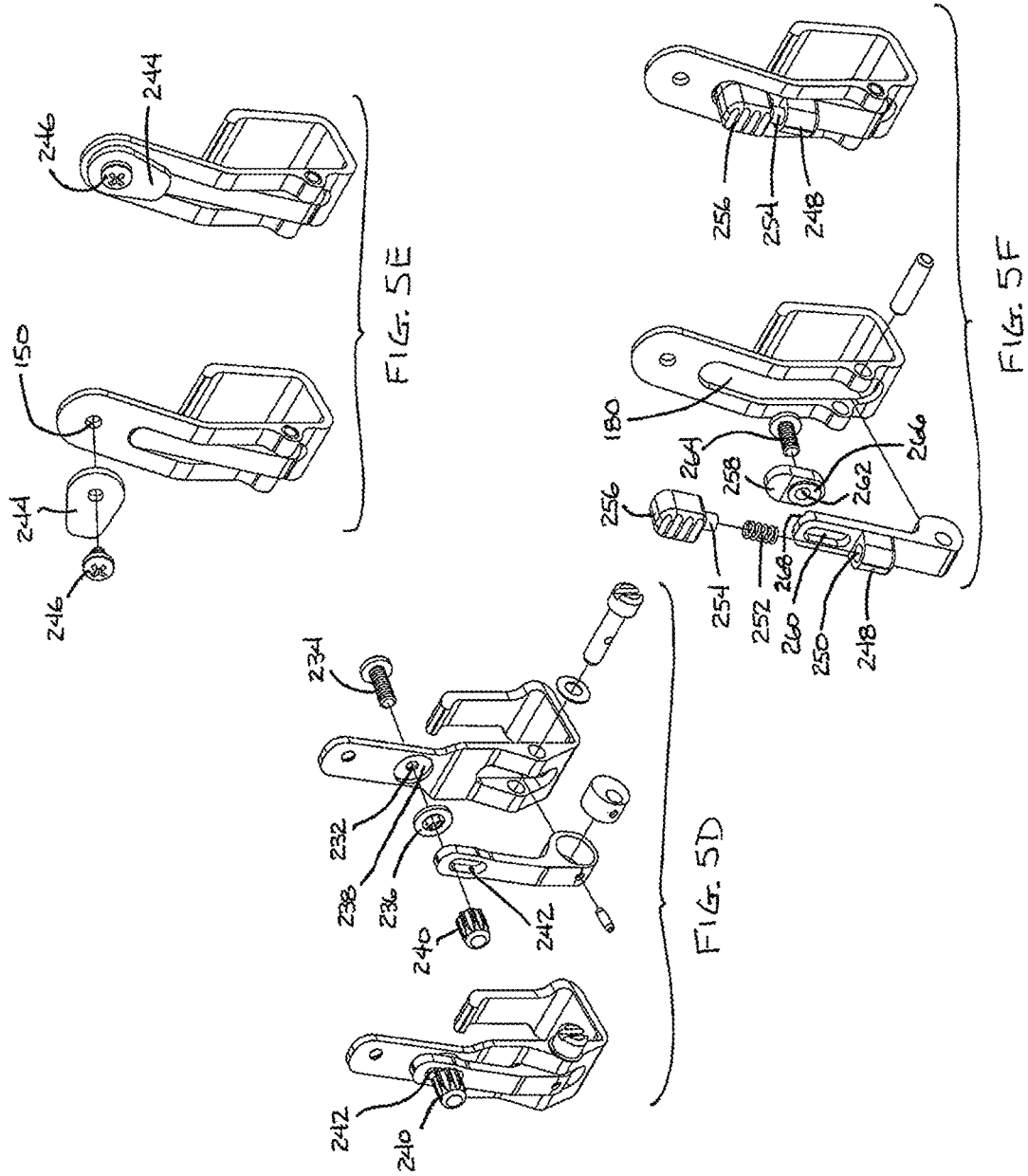

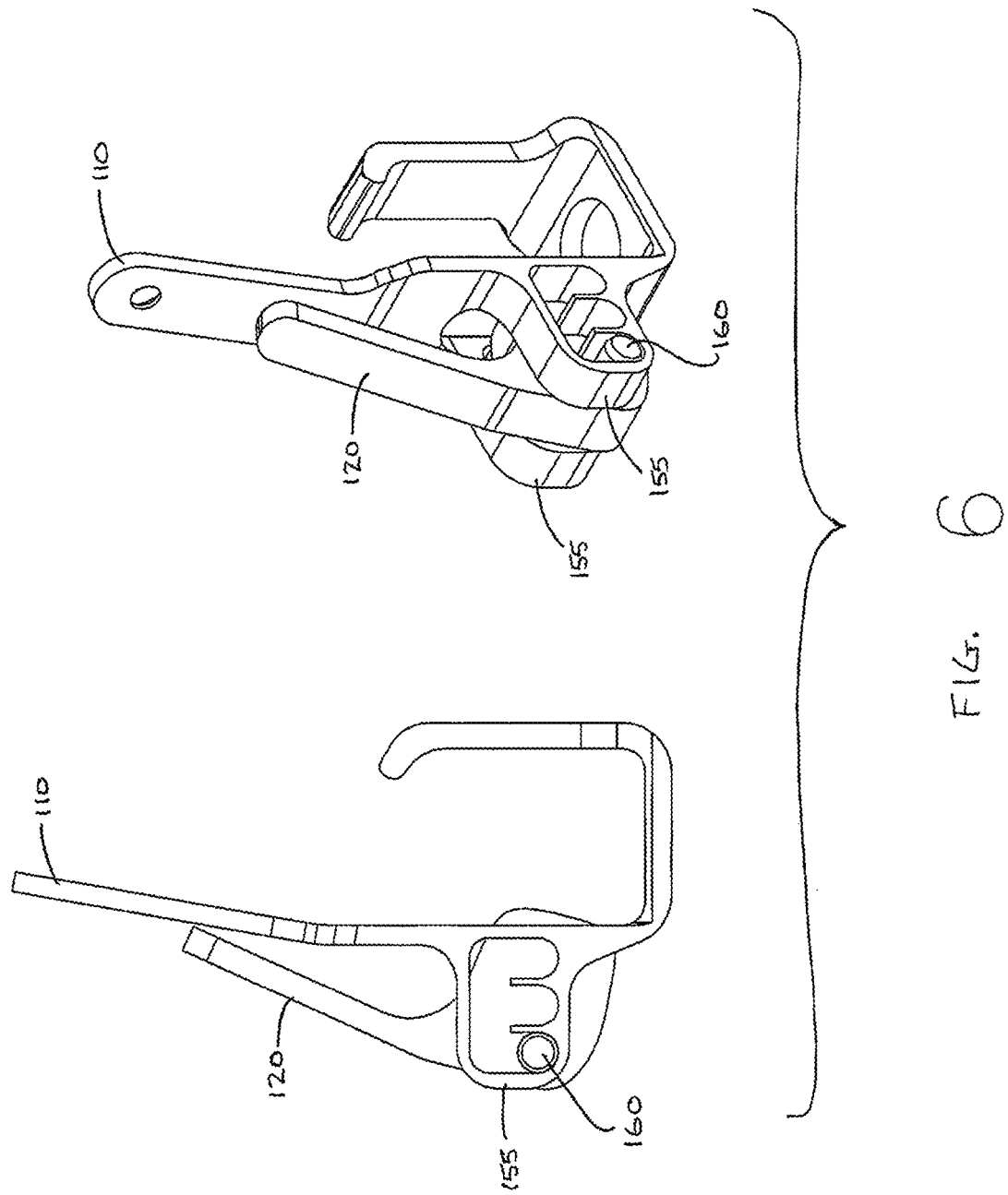

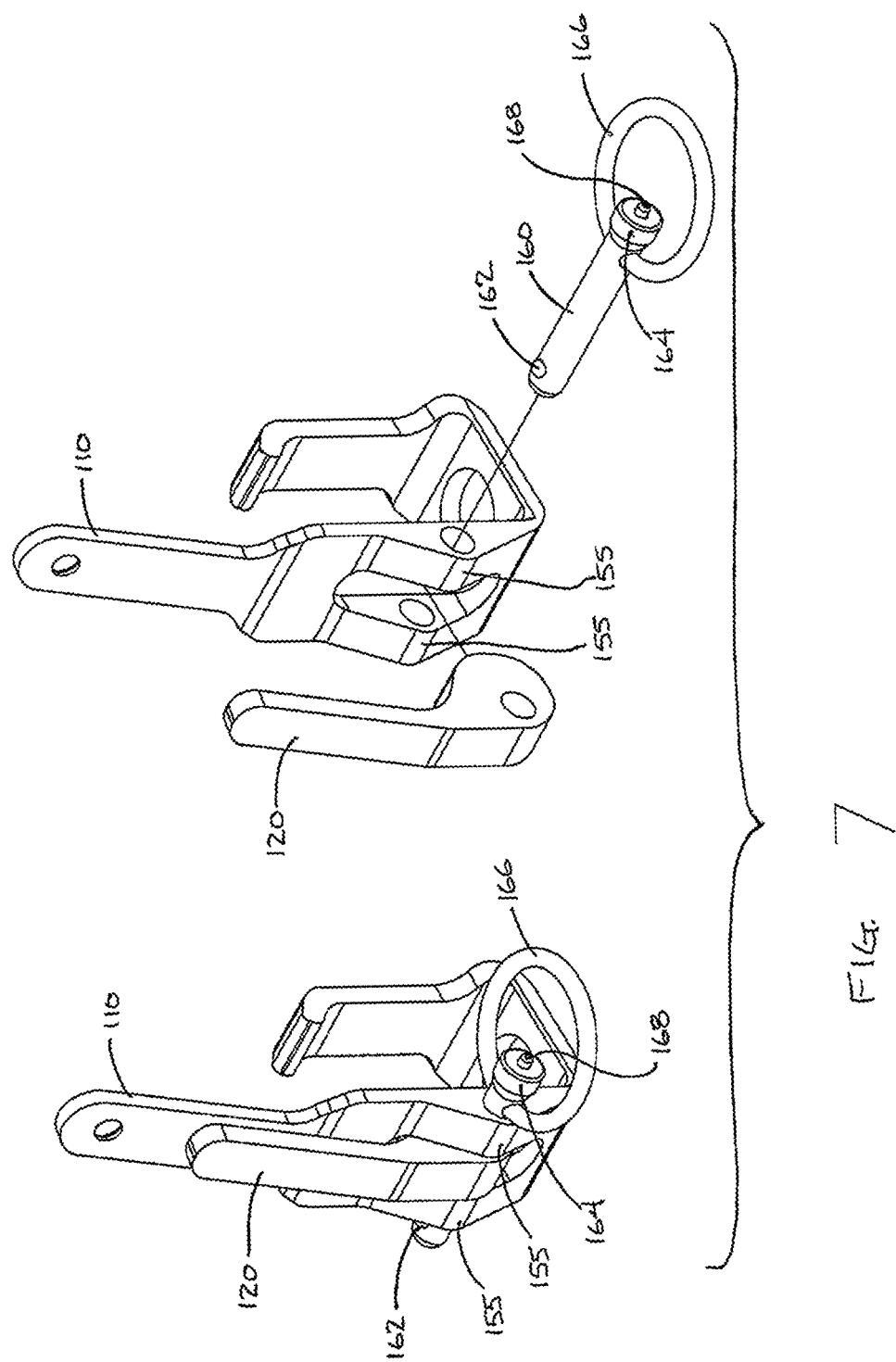

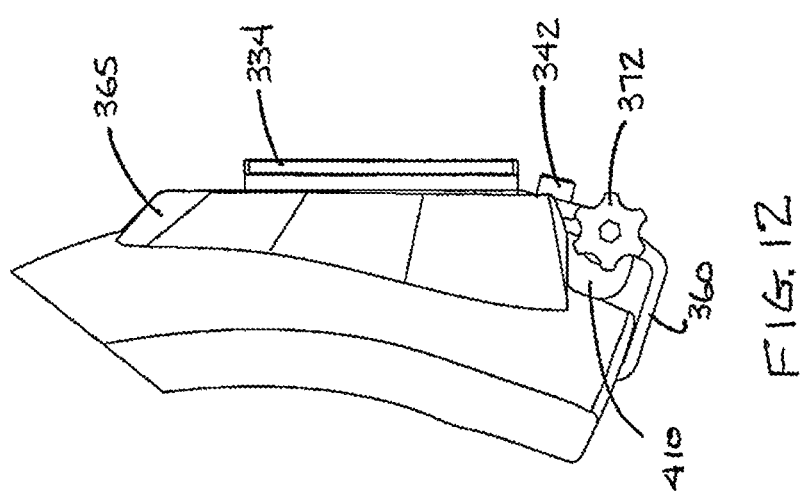

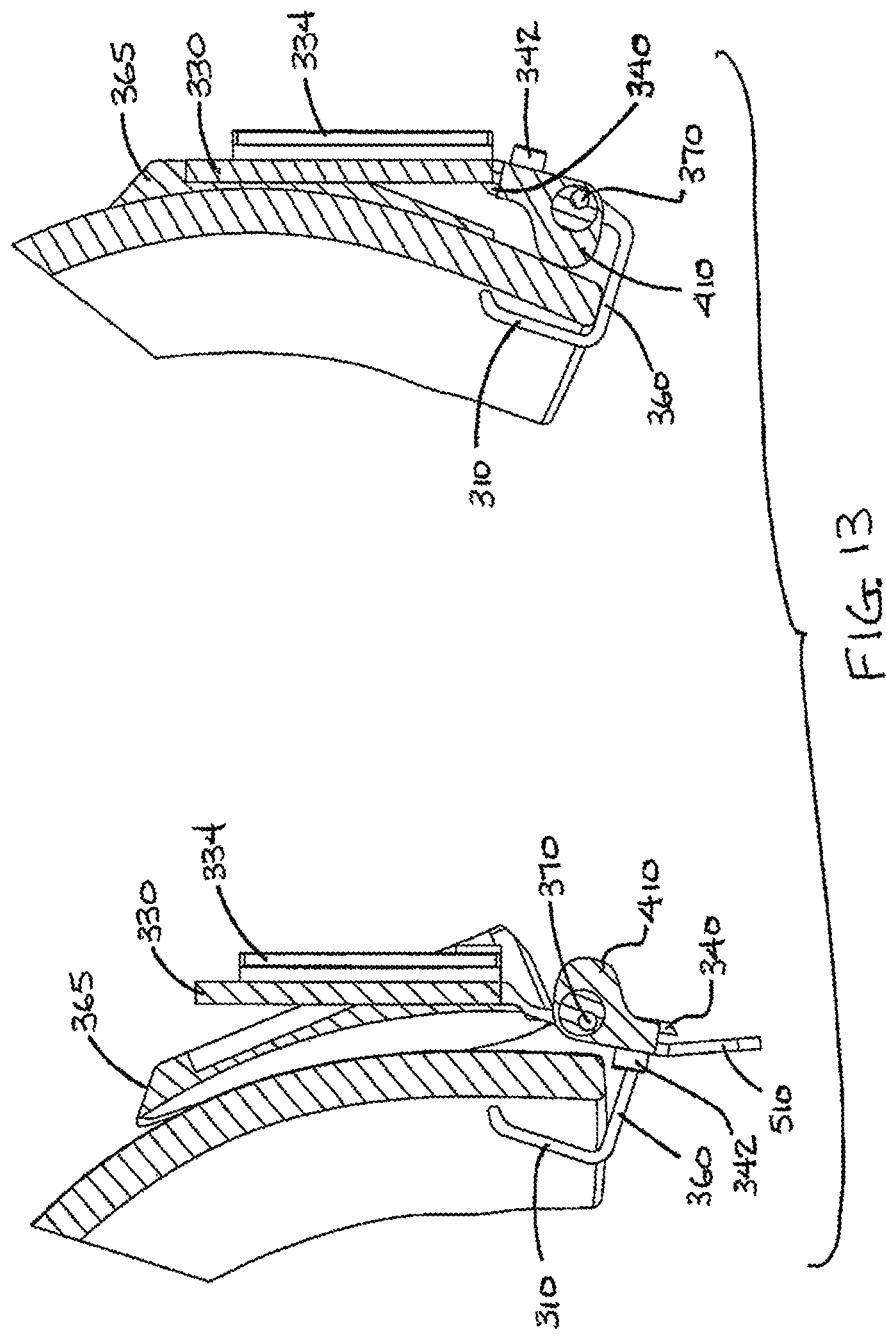

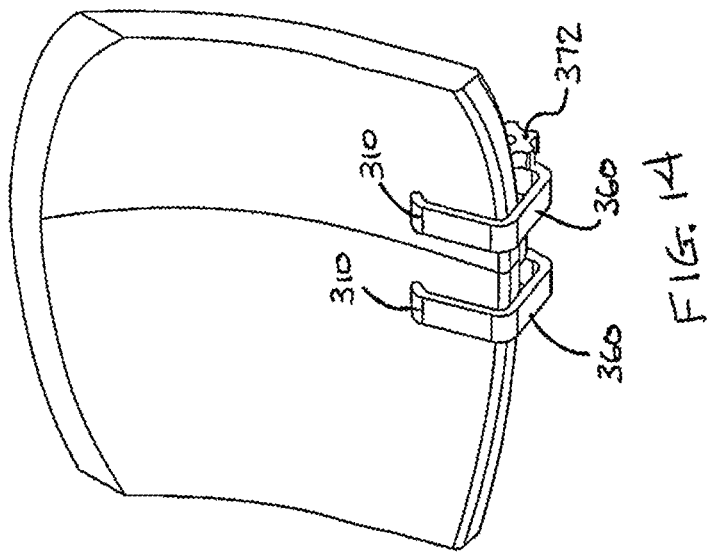

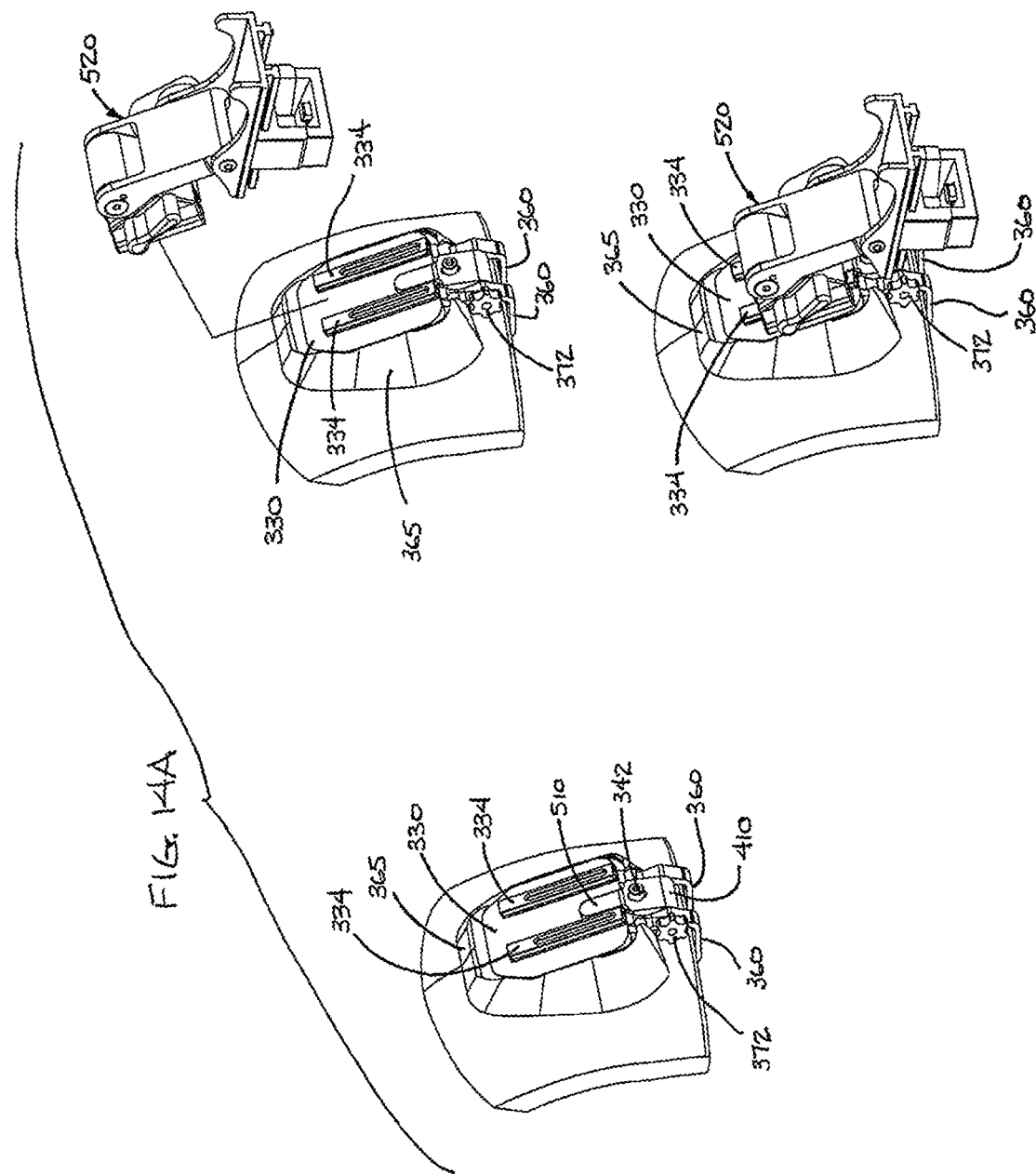

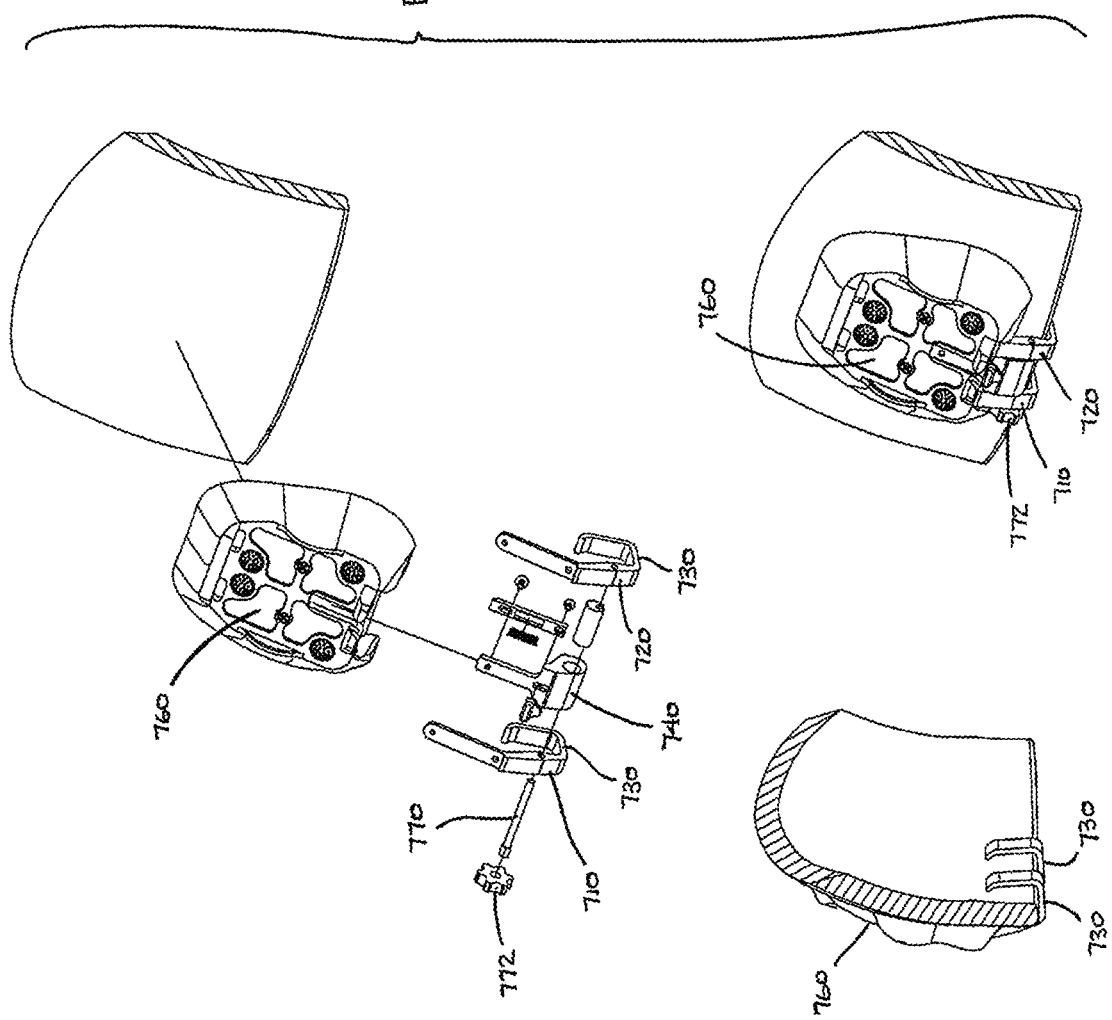

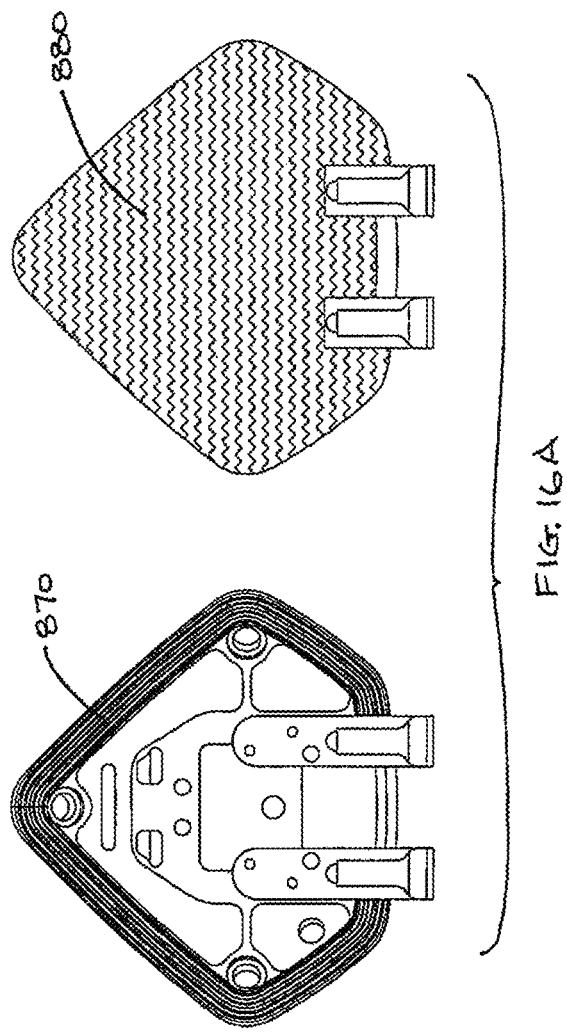
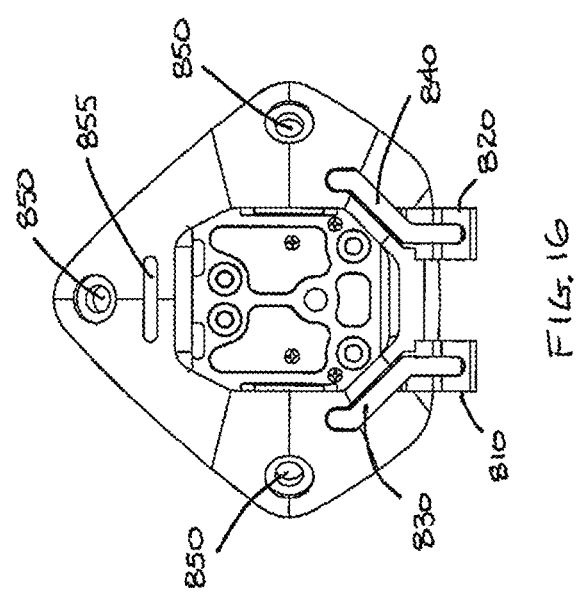
FIG. 16A
FIG. 16

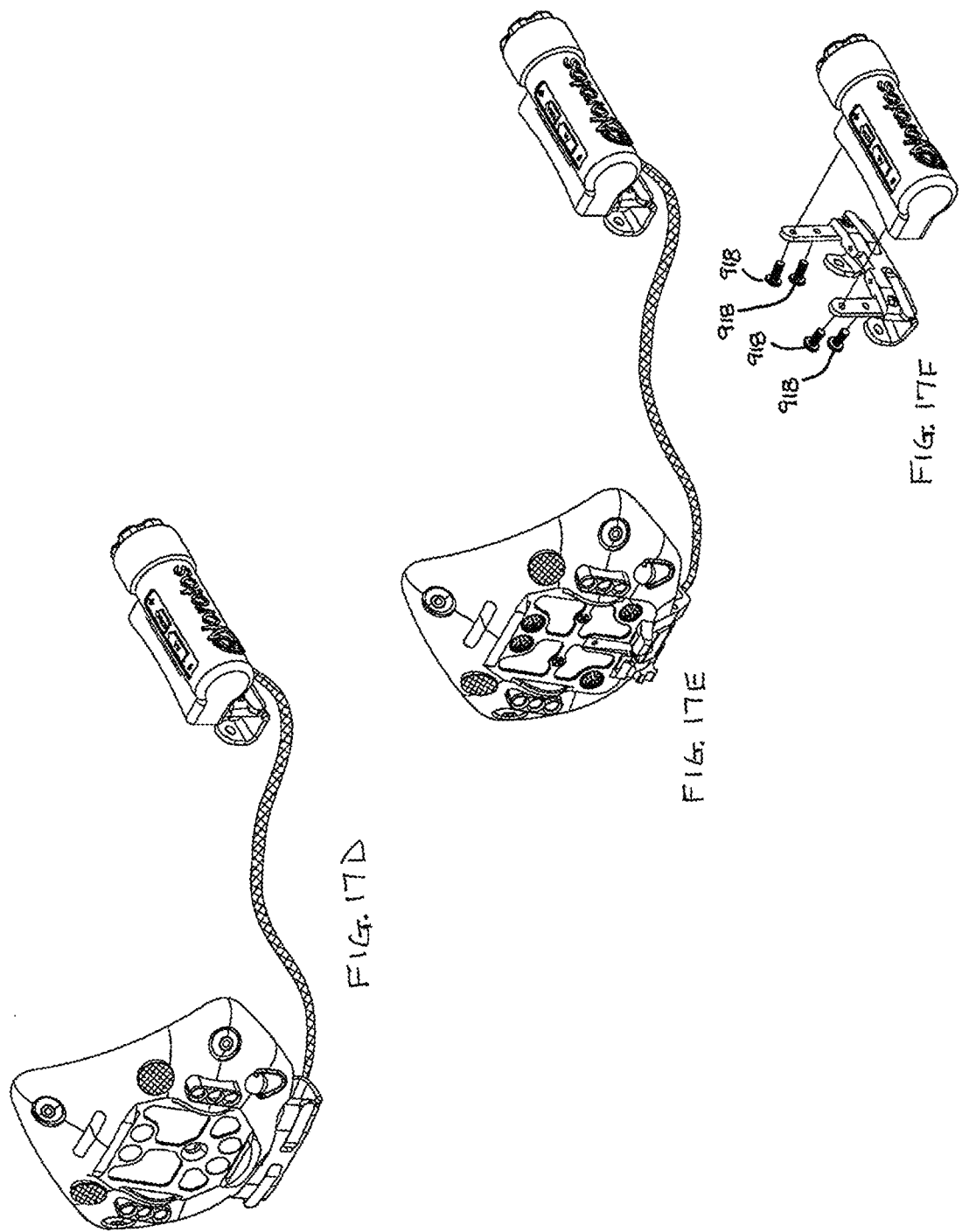

HELMET ATTACHMENT DEVICE

TECHNICAL FIELD

The present invention relates generally to helmet attachment devices.

BACKGROUND OF THE INVENTION

While wearing a helmet, it may be beneficial to attach night vision goggles or other accessories to the helmet. As such, it may be desirable to removably attach such accessories through the use of a plate or shroud. However, the problem with plates or shrouds is that it has typically been required that holes be drilled in the helmet to securely attach the plate or shroud to the helmet with screws or similar mechanical attachment members. This may result in a compromise in the integrity of the strength of the helmet. Also, should a projectile or a bullet hit a screw, the screw could potentially proceed through the helmet and possibly cause injury to a user's head. Alternative attachment methods not involving the use of screws have not previously been successful because they have not provided a stable and secure attachment to a helmet.

To overcome the shortcomings with existing attachment mechanisms for plates or shrouds, the present invention provides, in one or more embodiments, a helmet attachment device to mitigate or obviate one or more of the aforementioned problems. In addition, embodiments of the present invention provide a helmet attachment device that is lightweight, adjustable, and still able to provide a stable and secure attachment. Also, since embodiments of the attachment device may be quickly attached directly to a helmet without the use of tools, there is now an easier way to attach night vision goggles or other accessories to a helmet.

SUMMARY OF THE INVENTION

The present disclosure is directed to various embodiments of an attachment device which may include one or more of the following features.

An attachment device for a helmet, the attachment device comprising:
a clamp including means forming a "u" shaped lower section for receiving a portion of the helmet, wherein the clamp includes an exterior; and
a cam pivotally mounted to the clamp for movement between a released and clamped position to respectively disengage and engage the attachment device to the helmet.

The device wherein the clamp is flexible for compression to the helmet to ensure a secure fit.

The device wherein the cam further comprises a surface wherein the surface comprises a conforming material.

The device wherein the conforming material further comprises a textured pattern.

The device wherein the cam is adjustable.

The device wherein the cam is removable, and where cams of a different size are provided for mounting to the clamp.

The device wherein the width of the "u" shape lower section of the clamp is adjustable.

The device wherein the attachment device attaches a battery pack.

The device wherein the attachment device attaches a helmet shroud.

The device further comprising an over mold wherein the over mold covers edges of the attachment device.

The device wherein the attachment device attaches night vision goggles.

An attachment device for a helmet, the attachment device comprising:
a first clamp including means forming a "u" shaped lower section for receiving a portion of the helmet, wherein the first clamp includes an exterior;
a second clamp including means forming a "u" shaped lower section for receiving a portion of the helmet, wherein the second clamp includes an exterior;
a cam and comprising a single unit, the single unit pivotally mounted between the first clamp and the second clamp for movement between a released and clamped position to respectively disengage and engage the attachment device to the helmet, wherein the single unit comprises a locking mechanism comprising:
a movable latch adapted to disengage and engage the single unit,
a spring operatively attached for the movable latch to disengage and engage the single unit,
a lock to secure the movable latch, and
a release mechanism allows for the release of the movable latch; and
a mounting plate removably attached, respectively, to the exterior section of the first clamp and to the exterior section of the second clamp.

An attachment device for a helmet, the attachment device comprising:
a first clamp including means forming a "u" shaped lower section for receiving a portion of the helmet, wherein the first clamp includes an exterior;
a second clamp including means forming a "u" shaped lower section for receiving a portion of the helmet, wherein the second clamp includes an exterior;
a cam pivotally mounted to the first clamp and the second clamp for movement between a released and clamped position to respectively disengage and engage the attachment device to the helmet; and
a mounting plate removably attached, respectively, to the exterior section of the first clamp and to the exterior section of the second clamp.

An attachment device for a helmet, the attachment device comprising:
a first clamp including means forming a "u" shaped lower section for receiving a portion of the helmet, wherein the first clamp includes an exterior;
a second clamp including means forming a "u" shaped lower section for receiving a portion of the helmet, wherein the second clamp includes an exterior;
a cam pivotally mounted to the first clamp and to the second clamp for movement between a released and clamped position to respectively disengage and engage the attachment device to the helmet; and
a shroud removably attached, respectively, to the exterior section of the first clamp and to the exterior section of the second clamp.

A method of attaching from an attachment device for a helmet, the attachment device comprising a clamp including a "u" shaped lower section for receiving a portion of the helmet, wherein the clamp includes an exterior, and a cam pivotally mounted to the clamp for movement between a released and clamped position, comprising the step of:
disengaging; and
engaging the attachment device to the helmet.

An anchoring device for a helmet, the anchoring device comprising:

a clamp, wherein the clamp attaches to the back of the helmet;

an elongated member operably attached to the clamp for movement between a raised and lowered position, wherein the elongated member comprises:
 a top end, wherein the top end defines a groove,
 a bottom end, wherein the bottom end comprises two feet that extend horizontally and between the feet defines a slot,
 a narrow body between the top end and bottom end wherein the narrow body defines an opening along the body; and a cover, wherein the cover defines two wells, wherein the first well is at the far left side and the second well is at the far right side, wherein both extend vertically along their sides, wherein the feet are located at the bottom of the first and second well, respectively, the tensioner is housed within the cover, wherein the top of the feet captures the tensioner and engages the tensioner whereby the tensioner provides resistance for the elongated member.

The device wherein the tensioner are springs.

The device wherein the groove is three parallel orthogonally horizontal slot openings.

The device further comprising a strap, wherein the strap is operably attached to the clamp on one end, and operably attached to a shroud at the other end.

The strap further comprising a fishtail, wherein the fishtail is folded and inserted into a slot of the shroud, wherein the fishtail opens up and locks against the inside of the shroud.

The device further comprising a strap, wherein the strap is operably attached to the clamp on one end, and operably attached to an attachment device at the other end.

This summary is provided to introduce a selection of concepts that are further described below in the detailed description. This summary is neither intended to identify key or essential features of the claimed subject matter, nor is it intended to be used in limiting the scope of the claimed subject matter.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 3 is a perspective and a side view of an embodiment of the helmet attachment device showing when the clamp has flexible side portions;

FIG. 5 is side views showing minimum and maximum clamping widths for an attachment device according to an embodiment of the present invention incorporating a cam within a cam;

FIGS. 5A, B, C are perspective views both assembled and disassembled of different helmet attachment devices according to embodiments of the present invention with cam within a cam means for adjusting the clamping width of a clamp;

FIGS. 5D, E, F are perspective views both assembled and disassembled of different helmet attachment devices according to embodiments of the present invention with means for locking the cams in the closed position.

FIG. 6 is a side and a perspective view of an embodiment of the helmet attachment device showing the adjustability of a cam;

FIG. 7 is perspective views of an embodiment of the helmet attachment device showing a removable cam;

FIG. 12 is a side view of the helmet attachment device illustrated in FIG. 11;

FIG. 13 is side cross section views of the embodiment of the helmet attachment device illustrated in FIG. 11, one view as the device is being attached to a helmet and the other after the device has been attached;

FIG. 14 is a perspective view of the helmet attachment device illustrated in FIG. 11, showing the inside view of attachment to a helmet;

FIG. 14A is perspective views of the helmet attachment device illustrated in FIG. 11 attached to a helmet and receiving a helmet mount for night vision goggles;

FIG. 15 is perspective views of another embodiment of the helmet attachment device;

FIG. 16 is a front plan view of another embodiment of the helmet attachment device;

FIG. 16A is alternate back plan views of the device illustrated in FIG. 16;

FIGS. 17A-F are a front plan view and perspective views of embodiments of the helmet attachment device showing the attachment of various accessories to a helmet;

DETAILED DESCRIPTION

Figure 1:
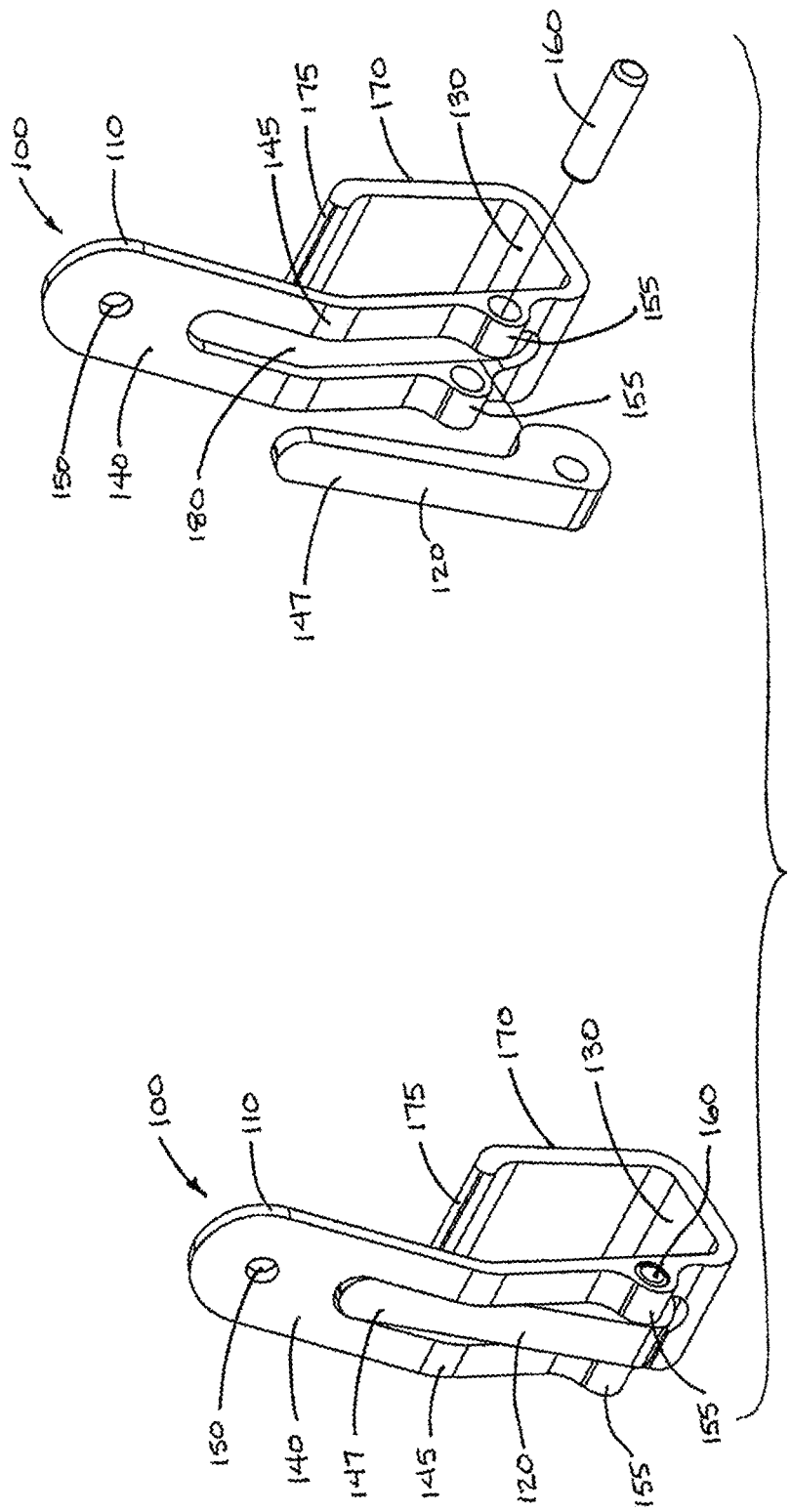
FIG. 1 is perspective views illustrating an embodiment of the helmet attachment device both assembled and disassembled.

Features of the inventive concept and methods of accomplishing the same may be understood more readily by reference to the following detailed description of embodiments and the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It should be noted that for the purposes of this application the terms "clamp" or "clip" are used interchangeably and are not intended to be limited to the specific structures shown and described but rather should be understood as extending to structures that accomplish one or more of the purposes described.

Embodiments of the present invention provide simplified installation of a shroud, plate or other accessories for attachment to a helmet. The simplified installation of the attachment device does not compromise the integrity or the strength of the helmet because it does not require use of drilled holes in the helmet to secure the accessories via the use of screws. In addition, embodiments of the present invention securely attach the accessories to the helmet.

In addition, embodiments of the present invention allow for secure attachment of accessories to a helmet without the need for use of any tools. In embodiments where tools may be used, they would generally be used to pre-set the attachment device for use and the tools would generally not be needed during use. Thus, accessories may be quickly and easily attached to or removed from a helmet by hand. This greatly simplifies the process of attaching accessories to a helmet.

Now referring to FIG. 1, perspective views illustrating an embodiment of the helmet attachment device are shown. A helmet attachment device 100 may include a clamp 110, and a cam 120. In one or more embodiments, the helmet attachment device 100 may be "u" shaped. The clamp 110 may include a "u" shaped lower section 130 for receiving a portion of the helmet. Moreover, the "u" shape may have a longer external arm than the internal arm. The clamp may include an exterior section 140 intended to be outside the helmet when the clamp is in place. The exterior section may have an outer facing region of the longer arm of the "u" shape of the clip. Also, the longer external arm may bend toward the helmet at the bend point 145. This bend may help conform the clamp to the helmet. It may also help make a cam handle more readily accessible for manipulation by a user as described below. There may be a shorter arm 170 of the clamp. In addition, the shorter arm may include an inward facing lip or protrusion 175 that may allow the device to conform more securely to the helmet. Thus, the clamp may look like a fishing hook in shape.

The clamp may be made of a material, such as aluminum or nylon, so that it has some give and resilience. This will allow the clamp to adjust somewhat to various helmet thicknesses, and, in some cases, allow it to grip the helmet somewhat even without use of the cam described below.

A cam 120 may be pivotally mounted to the clamp at the longer external arm for movement between a released and clamped position to respectively disengage and engage the attachment device to the helmet. The cam may have an elongated handle 147 extending outwardly that may make the movement between the released and clamped position easier to achieve. The cam may have an inwardly facing rounded portion that provides the cam surface that will contact the helmet.

An opening 180 in clamp 110 may receive the cam body and also the cam handle in the clamped position. The opening may be a cutout or slot on the exterior section 140. The opening may provide greater resilience to the clamp because the clamp is no longer solid and thereby may reduce the stiffness of the clamp. It also helps reduce the weight of the clamp. In addition, the handle may tuck into the opening. The opening may provide for a portion of the handle to fit into the opening. As discussed previously, the clamp may bend at the bend point 145. Without the opening, the handle may stick out more because the handle may not have the option to tuck into the opening. While the handle of the cam needs to be accessible to allow for operation of the cam by a user, if the handle sticks out too much, the handle may snag and catch on items of clothing, parachutes, lines, etc.

The clamp may be thin. The width of the clamp may range from less than about ⅛", to about several inches. This may also lower the weight of the device.

The clamp may have an ear or protrusion 155 at each side of the lower section 130 of the longer external arm. In addition, there may be a shaft 160 that provides a pivot point or axis for the cam that extends between and has opposite ends that are housed within each ear. As such, when the cam is rotated around the axis, the cam surface will gradually rotate relative to the helmet surface whereby a tight fit may be achieved with the helmet. The shaft ends may be held within the ears by several methods. As a non-limiting example, the shaft may be held by a press or friction fit. As such, the outside diameter of the shaft may be slightly oversized and the inside diameter of the holes in the ears may be slightly undersized. When the shaft is pressed into the ears, the parts interfere with each other's occupation of space. The result is that both parts elastically deform slightly to fit together creating a force that results in friction between the parts. The tightness of fit may be controlled by the amount of interference.

As another non-limiting example, the shaft may be held within the ears by a threaded shaft. One end of the shaft may have male thread or external thread and the inside of an ear may have a complementary thread also known as the female thread or internal thread that is designed to mate. The shaft may be threaded into the ear by the use of a screwdriver or wrench.

As another non-limiting example, a barrel bolt (also known as a barrel nut, Chicago screw, or post and screw) may be used to hold the shaft within the ears. The barrel bolt may include a female or internal threaded barrel and a male or external threaded screw that may have a barrel-shaped flange. The shaft may be threaded into the ears by the use of a screwdriver or wrench.

As yet another non-limiting example, a lock screw may be used to hold the shaft into the ears. The lock screw would have an external thread that may be mated with the internal thread on a cylindrical opening extending through the wall of one or more of the ears in a direction orthogonal to the axis of the shaft. The screw may be threaded into the cylindrical opening in one or more of the ears by the use of a screwdriver or wrench until the end of the screw contacts the shaft to hold it in place.

Figure 2:
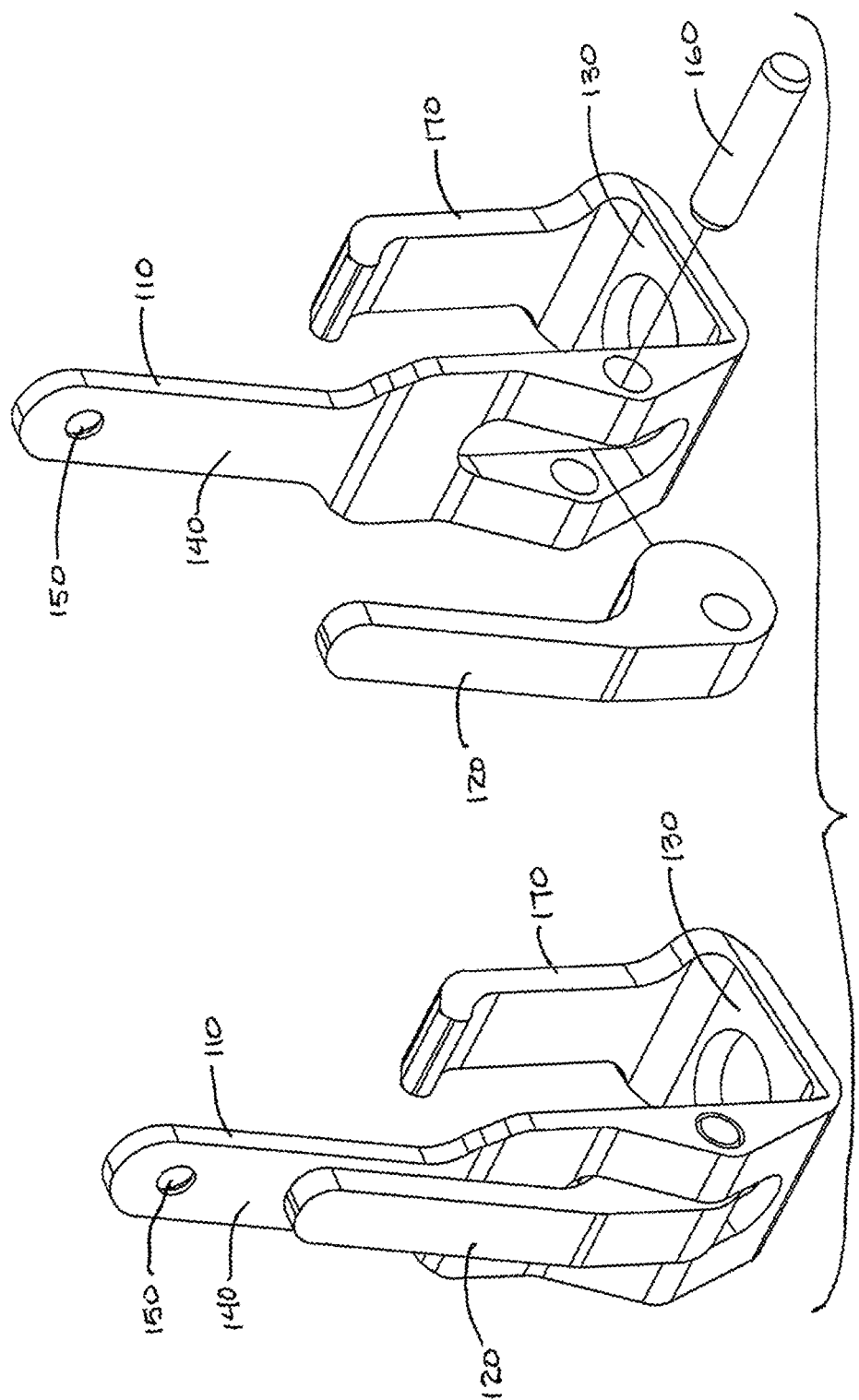
FIG. 2 is perspective views of another embodiment of the helmet attachment device both assembled and disassembled.

Now referring to FIG. 2, an assembled and a disassembled view of another embodiment of the helmet attachment device is shown. As a non-limiting example, the cam 120 may be removed from the clamp 110. The cam may be removed from the clamp by pushing the shaft out of the ears. If the shaft is held in place by friction fit, the user may use a pin to push the shaft out of the ears. If the shaft is held in place by a threaded shaft, the user may use a screw driver to remove the shaft. A screw driver may also be used if a barrel bolt is used. Any method known and used in the art for removing a shaft may be used.

Now referring to FIG. 7, perspective views of a helmet attachment device showing an alternative removable cam is shown. The cam may be removed from the clamp. In the embodiment of FIG. 7, the shaft 160 that is received within the holes in the ears of the clamp is of a length that allows each end of the shaft to extend beyond the outer openings of the holes and therefore beyond the side walls of the clamp. At one end of the shaft is an outwardly biased protrusion 162. This protrusion normally extends outwardly from the rounded side wall of the shaft and is positioned so that it will be beyond the outer opening of one of the holes in an ear on the clamp when the shaft is in position. As extended, the protrusion will prevent the shaft from being easily removed from the holes in the ears of the clamp.

At the other end of shaft 160 is an enlarged head 164. This enlarged head is positioned to remain outside the holes when the shaft is in position in the clamp and will aid in preventing the shaft from being pulled or pushed through the holes. A pull ring 166 is also located at the end of the shaft with the enlarged head. This pull ring intersects and is attached to the shaft just below the enlarged head at one side of the ring. The major portion of the ring extends out beyond the end of the enlarged head to provide an opening whereby the ring can be grasped by a user of the clamp. By grasping the ring, a user can then pull the shaft outwardly away from the holes in the clamp. Normally, protrusion 162 would prevent the shaft from being removed from the holes.

A push button 168 is generally centered in the end of the enlarged head facing towards the opening in the pull ring. Push button 168 is normally biased outward by a biasing element, such as a leaf spring, extending between the push button and the opposite end of the shaft through a hollow opening inside the shaft. The opposite end of the biasing element is also attached through a second length with protrusion 162. The arrangement is such that depressing push button 168 causes the biasing element to shift so as to retract protrusion 162. Thus, a user may grasp pull ring 166, depress push button 168, thereby retracting the protrusion and allowing the shaft to be pulled from the clamp and releasing the cam. This embodiment allows for quick removal and replacement of a cam as needed without the use of tools.

Figure 1C:
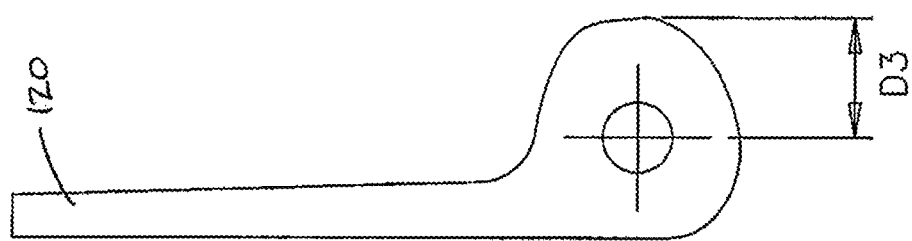
FIGS. 1A, B, C are side views illustrating cams with various distances from the pivot axis to the cam surface.
FIG. 1D is a side view illustrating a cam with a flat edge.
Figure 1B:
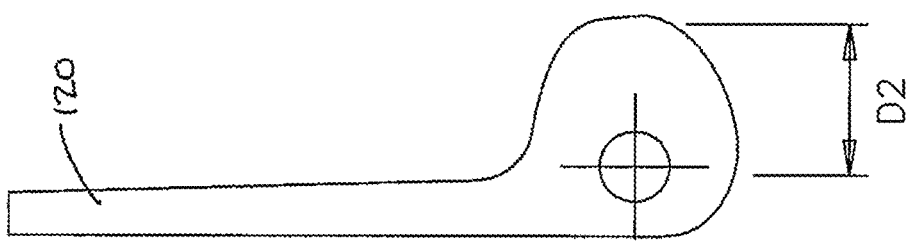
Figure 1A:
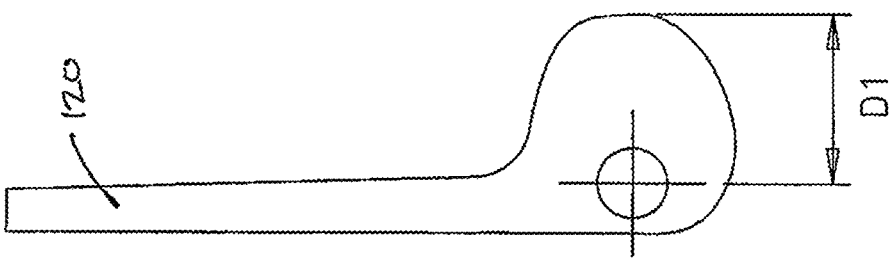

As shown in FIGS. 1A, B, C, cams may be made that have different distances from the pivot point to the cam surface. For example, in FIG. 1A, this distance is shown as $d_1$. In FIG. 1B, a cam is shown where this distance is shown as $d_2$, where $d_2$ is less than $d_1$. Further, in FIG. 1C, a cam is shown where this distance is shown as $d_3$, where $d_3$ is less than $d_2$ and $d_1$. Varying this distance allows a given cam to work to secure the attachment device to a helmet with a given thickness.

An attachment device can be constructed with a cam having a selected distance from the pivot point to the cam surface where the device is to be used with helmets having a relatively known thickness. As noted above, the resiliency of the clamp and the use of a cam does allow for some variation in the helmet thickness without preventing a snug attachment. Alternatively, where the shaft for the cam is removably attached to the clamp, such as using one of the attachment methods noted above, cams having a variety of distances, $d_1$, $d_2$, $d_3$, may be supplied as in a set or kit with the attachment device. The user may then choose the cam having the appropriate distance for the helmet to be worn and install that cam on the attachment device. If a different helmet having a different thickness is then to be worn, the user may then choose and install a cam with the appropriate distance if needed to ensure a secure attachment.

Now referring to FIG. 3, a perspective view and a side view of the helmet attachment device showing the flexibility of the clamp is shown. The clamp may straighten when engaged because the clamp may be flexible for compression. A lot of throw may be beneficial for compression of the clamp in order to ensure a secure fit for the attachment device to the helmet. This may also make it easier for a clamp to be placed on the brim of a helmet before the cam is engaged.

Figure 4B:
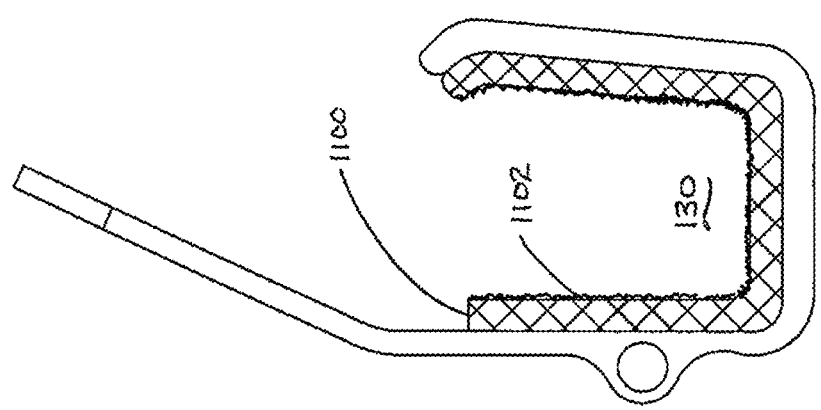
FIG. 4B is a side view of an embodiment of the helmet attachment device showing a use of texture on a clamp.
Figure 4A:
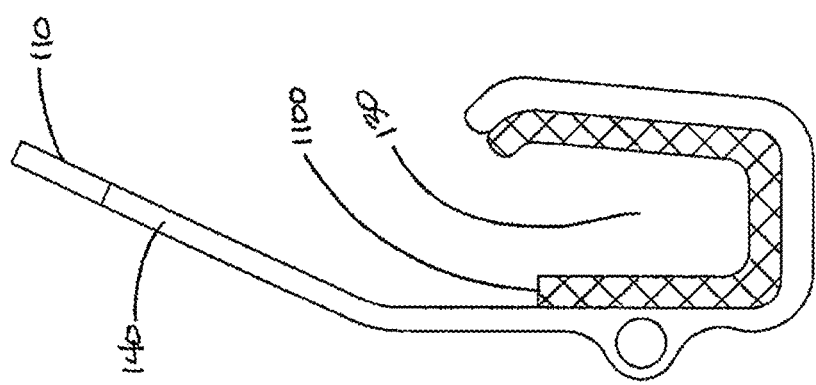
FIG. 4A is a side view of an embodiment of the helmet attachment device showing a use of a conforming material.

Now referring to FIG. 4A, a side view of the helmet attachment device showing a conforming material 1100 is shown. The conforming material may be a hard rubber or some sort of elastomer. The conforming material may add more traction between the clamp and the helmet. The conforming material is located along the inside surface of the lower "u" shaped section of the clamp, and may be attached to the clamp surface using an adhesive or other appropriate means.

Now referring to FIG. 4B, a side view of the helmet attachment device is provided showing texture 1102 on the clamp surfaces that contact the helmet. This may improve the traction between the clamp and the helmet. The conforming material may also have a textured pattern in order to provide even more traction. For example, the conforming material may have a pimpled, ribbed or waffle patterned outer surface.

Figure 8:
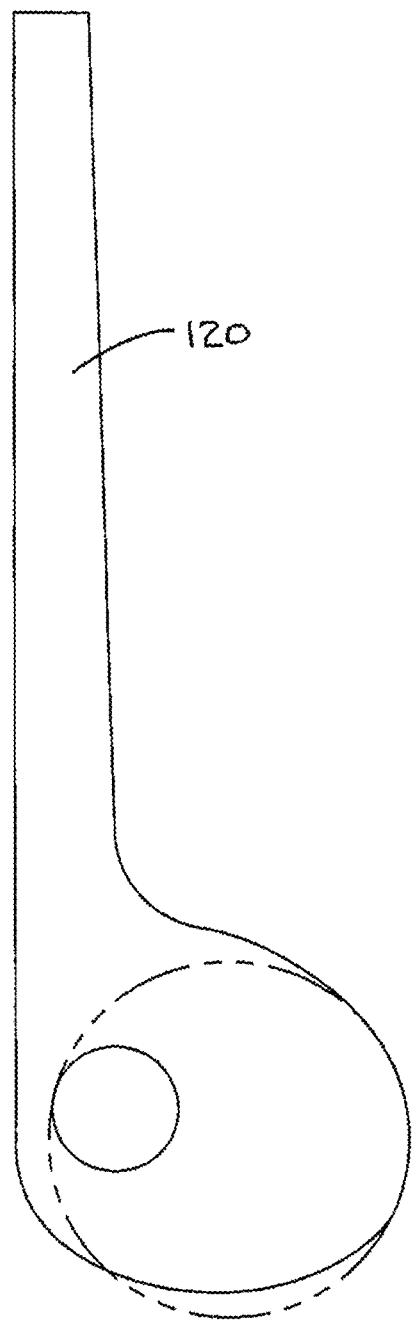
FIG. 8 is a side view of a cam with an eccentric axis.

Now referring to FIG. 8, a side view of a cam with an exaggerated eccentric shape relative to the axis is shown. The shape of the cam may be more eccentric to allow for greater variance in the distance from the pivot point to the cam surface and greater variability in the cam positioning that will secure the attachment device to the helmet.

With reference to FIG. 5A, perspective views of an attachment device are shown, both assembled and disassembled, that uses a cam-within-a-cam approach to allowing for adjustability in the width of the clamp mouth. As with embodiments described above, a generally cylindrical shaft 160 is received within circular openings passing through each ear 155 in the clamp. However, when the shaft is received in the ears, one end of the shaft 202 protrudes beyond the outer edge of one of the ears. That end 202 has a hexagonal, or other orthogonally-shaped, cross section adapted to receive a screw cap 204 that has a mating opening for the shaft on an inner end and a driver surface 206 on an outer end. As shown in FIG. 5A, the driver surface is slotted to receive the end of a slotted screw driver. It should be understood that the driver surface could be any of a number of interfaces capable of interacting with a driver.

Cam 120 has a large cylindrical opening 208 through its lower portion. Cylindrical disk 210 is sized to fit tightly within opening 208. Disk 210 itself has a cylindrical opening 212 extending from one flat surface of the disk to the other and positioned off center so as to be closer to the cylindrical wall of the disk at one edge of the disk. Cylindrical opening 212 is sized to receive shaft 160 therethrough. Disk 210 also has a pair of aligned through holes 214 that extend from one cylindrical edge of the disk to the opposite cylindrical edge to form a bore that intersects opening 212.

Upon assembly, disk 210 is placed within opening 208 in cam 120. The cam is then placed between the lower legs of the clamp so that shaft 160 can be placed through the ear holes of the clamp and also through opening 212 in disk 210 such that disk 210 and cam 120 are held in place relative to the clamp. The cylindrical surface of, shaft 160 has at least a circular recess 216 on it that is positioned so that it can align with the bore formed by through holes 214 when the shaft is in place in the disk. This circular recess may go all the way through shaft 160 to open to both of the aligned through holes 214. Cam 120 also has a circular through hole 218 extending from its outer, lower wall into opening 208 positioned so that it can be aligned with through holes 214 and circular recess 216. To complete assembly, a set pin 220 may be pushed through hole 218 in the cam into the longer of through holes 214 into recess 216. Set pin 220 has a length that allows it to attach disk 210 to shaft 216 without extending back into hole 218 in the cam. It also has a diameter that will create a friction fit with hole 214 and recess 216. Hole 218 in the cam may have a larger diameter so that the set pin can be more easily pushed through that hole and into place holding disk 210 fixed relative to shaft 160. When recess. 216 goes all the way through shaft 160, it allows for disassembly of disk 210 from the shaft by use of a tool to push set pin 220 out of the shaft and disk through the other through hole 214.

After assembly, disk 210 and shaft 160 are fixed in position relative to one another. Disk 210 may rotate within opening 208 in the cam. However, this may be a tight fit such that normal operation of the cam lever will rotate the cam about shaft 160, which may be received within the ear holes of the clamp in such a way as to rotate freely relative to the clamp body upon movement of the cam lever. The tight fit of disk 210 within opening 208 may, however, be overcome by using a driver on driver surface 206 to overcome the friction of the fit. Use of a driver may then allow a user to rotate the disk within the cam and thereby change the width of the clamp mouth as illustrated in FIG. 5. Rotating the disk so that the wide portion of the disk is toward the outside of the clamp minimizes the cam's extension into the clamp mouth and allows for use of the clamp with thicker helmet walls. Rotating the disk so that the wide portion of the disk is toward the inside of the clamp maximizes the cam's extension into the clamp mouth and allows for use of the clamp with thinner helmet walls.

With reference to FIG. 5B, a perspective view of an alternate embodiment of a cam-within-a-cam adjustment mechanism is shown. In the embodiment of FIG. 5B, a disk 210 is again fixed to a shaft 160 with a set pin 220. However, shaft end 202 with the orthogonally-shaped cross section is adapted to receive a lever arm 222. Lever arm 222 can then be moved by a user to rotate disk 210 within the cam and adjust the clamp mouth width between the two positions illustrated in FIG. 5. An advantage of an embodiment like that of FIG. 5B is that once the cam is assembled in the clamp, a user can adjust the width of the clamp mouth using lever arm 222 and need not use a separate tool to make such an adjustment.

With reference to FIG. 5C, a perspective view of yet another alternate embodiment of a cam-within-a-cam adjustment mechanism is shown. The embodiment of FIG. 5C uses a spring-loaded lever arm 224 to adjust the width of the clamp mouth. Spring-loaded lever arm 224 is held on the end of shaft 160 by a threaded screw 226. A threaded opening 228 is provided extending lengthwise down the interior of shaft 160 to receive the threaded shaft of screw 226. Screw 226 is shown with a Philips-style head. However, it should be understood that other head styles may also be used. It should also be understood that other appropriate means may be used to hold lever arm 224 on the shaft. Although lever arm 224 is held on shaft 160 by screw 226, it interacts with shaft 160 through a coil spring 230 when it is turned. Thus, when a user turns lever arm 224, the turning motion will first serve to compress spring 230. Once spring 230 is sufficiently compressed, the turning of the lever arm will be communicated to the shaft 160 to overcome the friction holding disk 210 in place in the clamp body. This will introduce a slight delay into any adjustment of the width of the clamp mouth. However, it will also prevent inadvertent contact with the lever arm from effecting any adjustment of the clamp mouth.

With reference to FIG. 5D, perspective views, both assembled and disassembled are shown, of an attachment device according to the present invention incorporating a means for locking the cam in the closed position relative to the clamp. This type of locking means may be provided to lock the cam in the closed position once a clamp has been put in position on a helmet. In the embodiment of FIG. 5D, a hole 232 is placed through the outer arm of the clamp. A threaded screw 234 is placed through hole 232 oriented so that its shaft faces outwardly away from the helmet on which the clamp is placed. The head of the screw will be on the inward surface of the outer arm of the clamp so as to be positioned between the clamp and the helmet. A retaining washer 236 is received on the screw shaft to hold the screw in place with the shaft facing outwardly. A circular recess 238 may be provided in the outer surface of the clamp are around hole 232 sized so as to receive retaining washer 236. This recess allows the washer outer surface to be flush with the outer surface of the clamp arm so that the cam handle may be closed against the clamp arm. A knurled cap 240 is provided with a threaded opening adapted to be threaded on the outwardly facing shaft of screw 234. The cam handle also includes a slotted opening 242 able to receive the screw shaft when the cam handle is closed. The opening is sized and slotted to allow it to receive the shaft easily despite any adjustments that have been made. Once the cam handle is closed with the screw shaft protruding through the slotted opening, a user can thread the knurled cap onto the end of the shaft of the screw and tighten it down to lock the cam in place. Although the embodiment of FIG. 5D is shown with cam-within-a-cam width adjustment, it should be understood that this cam locking mechanism may be used with other embodiments of the attachment device.

With reference to FIG. 5E, perspective views, both disassembled and assembled, are shown of another embodiment of a cam locking means. The embodiment of FIG. 5E uses an aperture 150 placed at the top of the outer arm of the clamp. This embodiment also involves a cam handle that is substantially received within opening 180 in the outer arm of the clamp when the cam handle is closed. A rotatable tab 244 is attached to the top of the outer arm of the clamp at aperture 150 by a screw 246. Screw 246 is shown with a Philips-type head, but it should be understood that other types of heads may also be used. In use, tab 244 may be attached to the clamp by screw 246 in a position where it is rotated out of the way of opening 180. Once the cam handle is closed and within opening 180, a user can loosen screw 246, rotate tab 244 to be over the top of the cam handle, and then tighten screw 246 to hold the tab in position and thereby lock the cam handle in place.

With reference to FIG. 5F, perspective views, both disassembled and assembled, are shown of yet another embodiment of a cam locking means. The embodiment of FIG. 5F also involves a cam handle that is sized so as to be substantially received in opening 180 in the outer clamp arm when the cam handle is closed. A bushing 248 is located on the outer surface of the cam handle. Bushing 248 has a cylindrical recess 250 in it extending downward form the top surface of the busing. Recess 250 is adapted to receive a coil spring 252 or other biasing means as well as a cylindrical shaft 254 extending downward from the lower surface of a push button 256. Shaft 254 presses down on the coil spring and captures it within recess 250.

A back plate 258 is positioned on the opposite side of the cam handle from push button 256. The cam handle has an elongated slot 260 through it that is positioned above the bushing. Back plate 258 has a hole 262 through its lower end that receives the threaded shaft of a screw 264. The back plate also has a projecting portion 266 that surrounds hole 262 and projects outwardly from the surface of the back plate facing toward the inner surface of the cam handle. The inner surface of the cam handle has a recessed track 268 that receives projecting portion 266. Screw 264 attaches the back plate to the push button through slotted opening 260. Push button 256 has a threaded recess in its back surface to receive screw 264. When the back plate is attached to the push button, the push button is able to move up and down along the cam handle against the force of the coil spring. The projecting portion moves along the recessed track to keep the motion aligned with the cam handle. The bias of the coil spring is to keep the push button extended so that the screw shaft is at the top end of elongated slot 260. In use, a user can depress the push button against the action of the spring while pivoting the cam handle to the closed position. In the closed position, the back plate will pass through opening 180 in the clamp arm. The user can then release the push button so that the back plate will slide up behind the clamp arm and the push button will slide up in front of the clamp arm. This will lock the clamp handle in position. The inner surface of the push button and the outer surface of the back plate may be sloped at the top to make it easier for them to receive the clamp arm at the top of opening 180 when they slide into the locked position.

Figure 9:
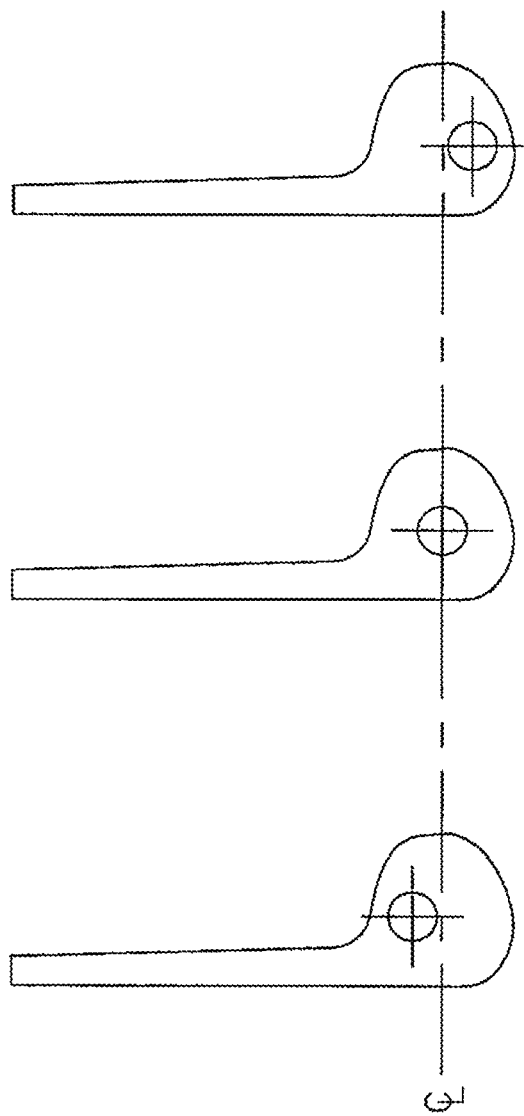
FIGS. 9A, B, C are side views of cams having pivot axes aligned above, in line with, and below the contact point of a cam with a helmet.

With reference to FIGS. 9A, 9B, and 9C, side views are shown of another way in which changing the cam used with the attachment device can change the operation of the attachment device. When a cam is rotated into position to press against a helmet it will have a contact point with the helmet. The force of the contact will extend back through the cam. The point about which a cam will pivot is determined by the location of the cylindrical opening that receives the shaft through the cam body. In FIG. 9A, the cam pivot point is located above the force line extending from the point of contact for the cam. In such a configuration, the contact force will tend to pivot the cam toward a closed position. In FIG. 9B, the cam pivot point is aligned with the contact point force line. In this configuration, the contact force is neutral. It does not tend to open or close the cam. In FIG. 9C, the cam pivot point is below the contact point force line. In this configuration, the contact force will tend to pivot the cam toward an open position.

As noted above, the attachment device may be configured to allow for changing the cams used with the device. Thus, cams may be selected that will tend toward an open or a closed position, or that will be neutral in this respect. In some situations it may be beneficial to have a cam that will tend to the open position. For example, when cam locking means like those described above are in use, there is not much concern about a cam opening inadvertently. However, when the locking means is released, it would be useful for the user to have the cam tend to open so that upon unlocking the attachment device is then easy to remove. However, there may also be situations where it may be beneficial to have a cam that will tend to the closed position. For example, if a separate cam locking means is not being used, having a cam that tends to stay closed will help prevent inadvertent opening of the cam during use of the attachment device.

Figure 10:
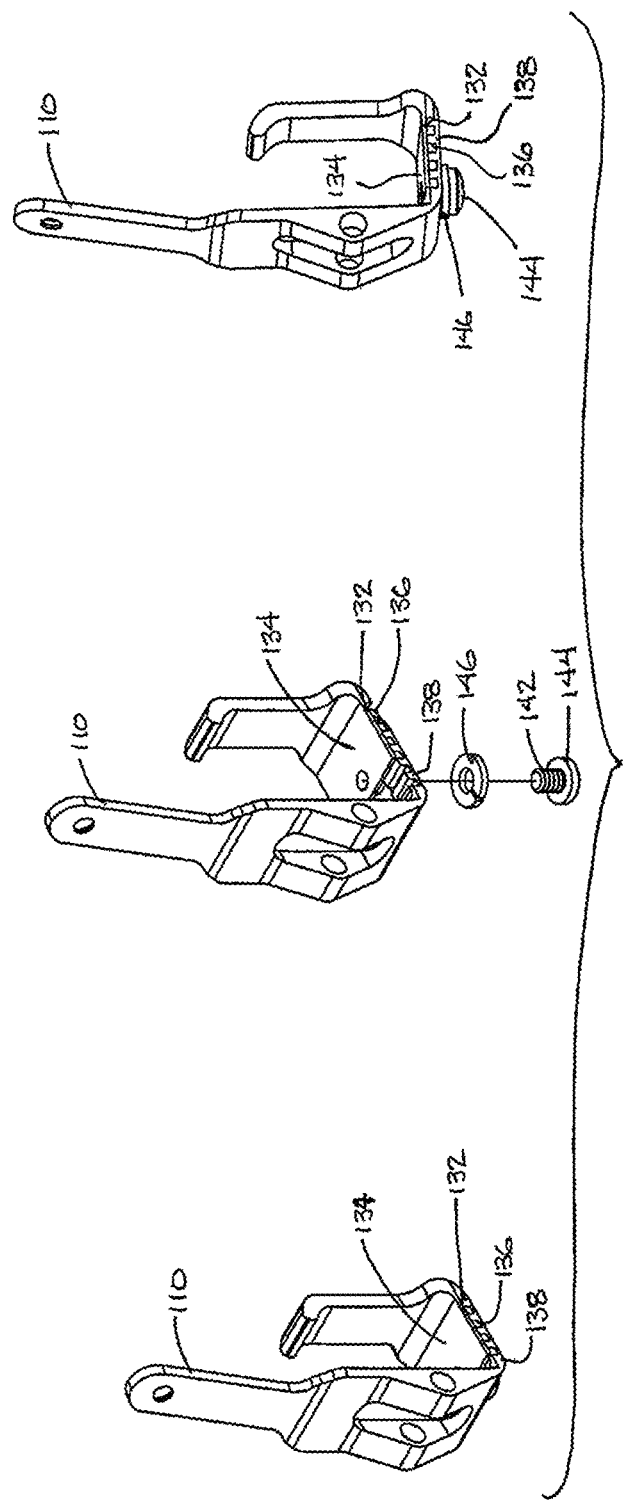
FIG. 10 is perspective views of the helmet attachment device showing an adjustable clamp.

Now referring to FIG. 10, perspective views of a helmet attachment device showing the adjustability of the clamp are shown. The distance between the lower segments of the clamp itself may be adjustable to allow for use of a given clamp with a wide variety of helmet thicknesses. In this embodiment, the lower wall of the lower "u" shaped section of the clamp is divided into two sections. An upper section 132 is attached along one end to the shorter arm of the clamp, has an upper surface 134 that is flat and that would face toward the helmet when the clamp was in use, and has a lower surface with rectangular ribs 136 extending downwardly along opposite side sections of the lower surface. The ribs are separated by spaced rectangular troughs. A lower section 138 has two arms extending outwardly from and attached at one end to the longer arm of the clamp. Lower section 138 has a flat lower surface that would face away from a helmet when the clamp was in use. The arms of the lower section have upwardly extending rectangular ribs separated by spaced rectangular troughs. The ribs and troughs of the upper and lower sections are oriented, sized and spaced such that the two sections can be fitted together with different degrees of overlap between the two sections as shown in FIG. 10. Thus, with the two sections fully overlapped, the clamp will have a narrower mouth. By moving the sections relative to one another to reduce the amount of overlap, the mouth of the clamp may be widened.

A set screw 142 may be used to hold the two sections of the adjustable clamp in position once the desired width for the clamp has been selected. The set screw has a head 144 wide enough to span the two arms of the lower section. The set screw may be threaded and may be received upwardly into an opening in the center of upper section 132. A lock washer 146 may be provided to keep the set screw tight once it has been tightened down with its head against the lower surface of lower section 138. A tool may be used to loosen the set screw to allow for adjustment of the width of the clamp and then be retightened once a new width has been selected.

Although in the above-described embodiment, the upper section has been shown as attached to the short arm of the clamp and the lower section has been shown as attached to the longer arm of the clamp, it should be readily understood that relative attachment of the sections could be reversed without departing from the spirit of the operation. Also, although the mating surfaces have been described as ribs separated by troughs, it should be understood that other regular mating surfaces allowing for adjustability could be used without departing from the spirit of the operation.

Figure 1D:
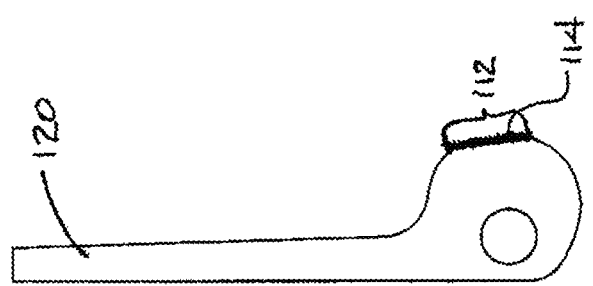

The cam surface may also have a flat section 112 (see FIG. 1D) so that the cam will tend to seat or lock in place when rotated to the position where the flat section rests against the surface of the helmet. The cam surface may also be provided with a texture or friction enhancing surface 114 to help it stay in place against the helmet surface.

The cam may be adjustably positioned on the clamp so that it may move inward to accommodate various helmet cross-sections. The inward/outward design may be adjusted by a built-in device (see FIG. 6) or by graduated pivot points within the cam itself. As such the user, may adjust the inward/outward design or it may be adjusted at the factory during manufacturing.

Now referring to FIG. 6, a side and a perspective view of the helmet attachment device showing the adjustability of the cam is shown. The cam may be adjustable within the clamp to allow for use with helmets of varying thickness. In the embodiment of FIG. 6, a shaft 160 is fixedly attached to a cam 120 at a central point along its length. Thus, on either side of the cam, the opposite ends of the shaft extend outwardly into the ears of the cam. However, in this embodiment, ears 155 are elongated and contain a series of "u" shaped depressions along the bottom of the hole extending through each of the ears. Three depressions are shown in FIG. 6, but it should be understood that more or fewer may also be used. The depressions are rounded and shaped to receive the shaft such that the shaft may be freely rotated within whichever of the depressions it is resting in. The space of the hole opening above the depressions is sufficient to allow a user to lift the cam and attached shaft out of a given depression and move it to any of the other depressions. Thus, a user may adjust the pivot point of the cam relative to the mouth of the clamp by lifting and moving the cam such that the shaft ends rest in an appropriate depression.

Figure 20:
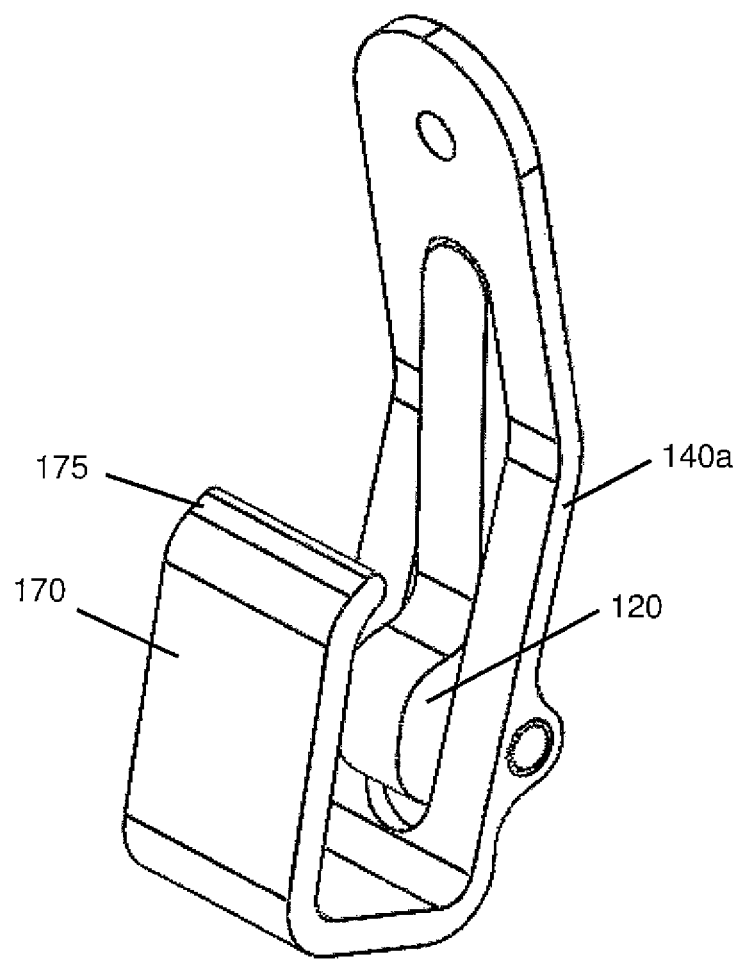
FIG. 20 is a perspective view of a helmet attachment device according to some embodiments.

The attachment device construction may also be reversed or reversible. For example, the shorter arm 170 may face the outside of the helmet and the cam may be located on the internal arm (see FIG. 20, in which the shorter arm 170 is to face the outside of the helmet when the clamp is in place and the cam 120 is located on the internal arm 140*a*). Other modifications to the configuration of the clamp and cam and their position relative to one another can also be made without changing the fundamental way in which the combination attaches to a helmet. For example, a clamp may be constructed with straight sides that are relatively equal in length. This form of clamp could be adapted to be used with the cam on the outside or inside of the helmet depending upon user preference or the circumstances.

Different angled cams may also be used. The cams may be oriented vertically, horizontally, or any angle that may be beneficial for the particular purpose. (See, e.g., FIGS. 17B and 17C.) The bottom arm of a clamp may also be angled to allow for clamps to be attached to a helmet at different angles.

Other aspects of the configuration of the cam and clamp may also be modified to suit particular applications without departing from the way in which the combination attaches to a helmet. For example, the cam handle may be longer or shorter as needed to allow for operation of the cam. The cam handle may also be configured with a broadened section to make it easier to operate by finger pressure from a user.

The attachment device may further include an aperture 150 that is adapted to allow a screw or other attachment means to attach an accessory to the device and thereby to the helmet. As a non-limiting example, the attachment device may be used to retrofit an existing shroud and the aperture may be used to attach the attachment device to the existing shroud. One example of such a use will be further illustrated when describing FIG. 16.

In addition, the attachment device may be used in several ways. The cam 120 may be unlocked and then the clamp 110 may be placed under the brim of a helmet to fit any size helmet. The attachment device may be used with helmets with or without a rim. It may also be used on ECH, non-metallic or equivalent helmets. Once the clamp is placed under the brim of the helmet, then the cam may be rotated to the engaged position. The back portion of the cam may be further rotated to the rounded portion of the cam. The rounded portion of the cam may cause the clamp to be tightly secured to the helmet. The aperture 150 may be used to attach accessories.

A single or multiple attachment devices may be used independently over the entire circumference of the helmet.

Each attachment device may be equipped to accommodate several accessories. As a non-limiting example, the accessories may include lights, infrared lights, signaling nodes, or may be used as a safety tether. Furthermore, the attachment device may be used to attach on to the helmet and allow other items to be held such as wands, small flags, lights such as signaling devices or other items as desired.

The attachment device may be used in lieu of the standard front bracket by attaching to the helmet mount. Instead, the attachment device may attach directly to the helmet and thereby eliminate the need for drilling of one or more holes in a helmet and therefore not compromise the ballistic properties of the helmet.

Figures 17B, 17C:
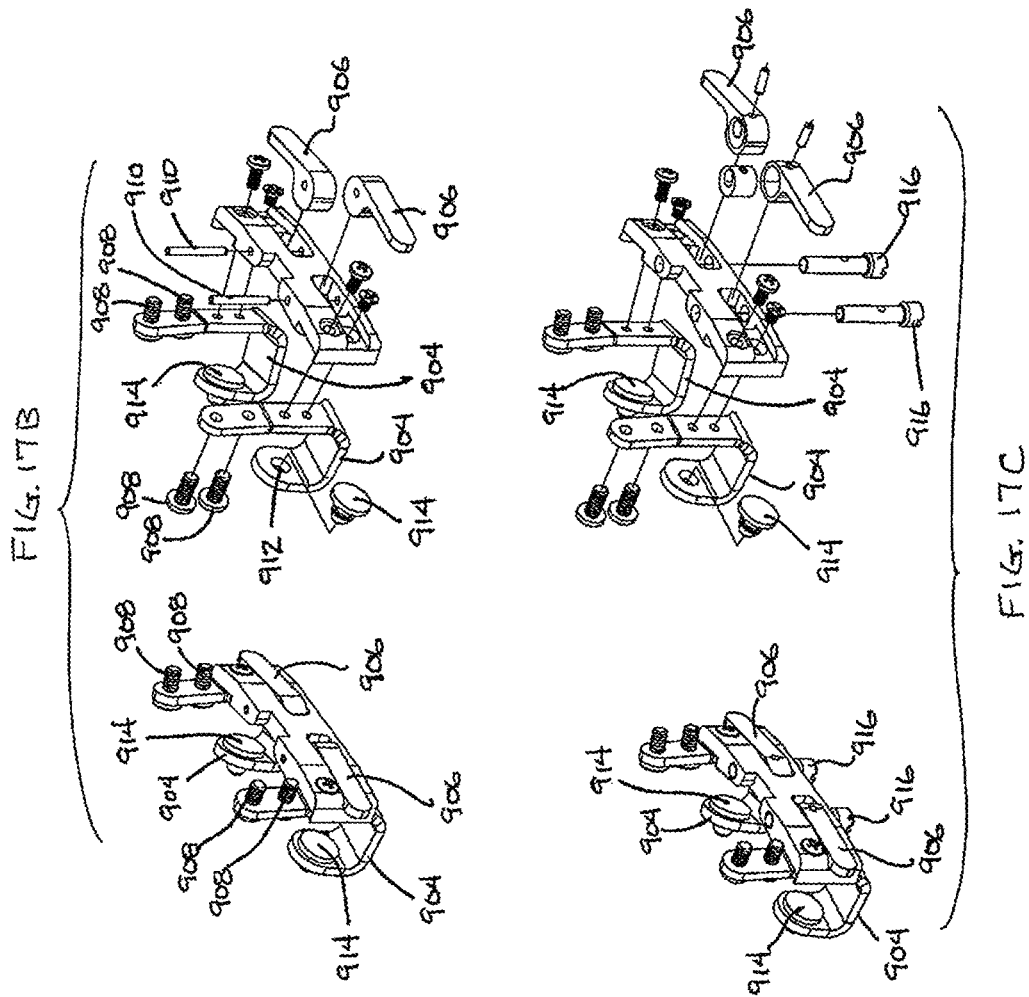
Figure 17A:
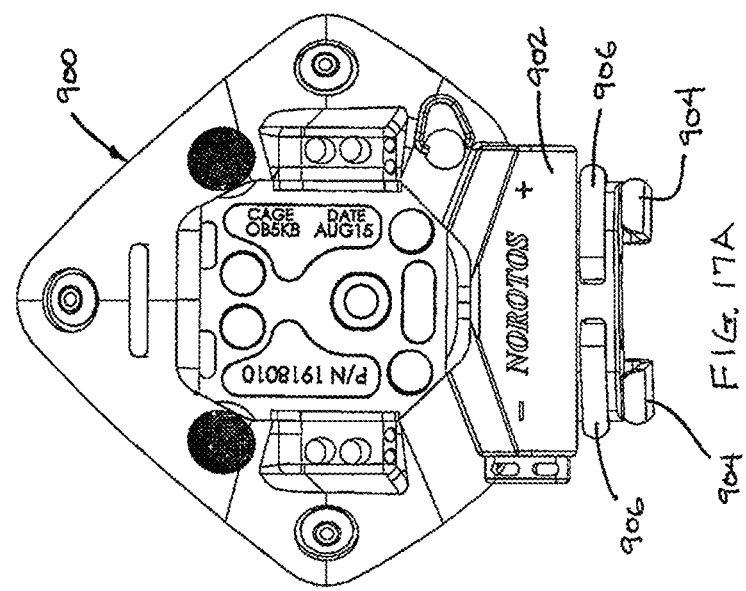

Moreover, the attachment device with integrated light(s), IR light or other visual or signaling capability may be powered by a self-contained power source or be able to be plugged into an alternate power source such as the Norotos Shroud-Light integrated battery pack (see FIG. 17A).

The attachment device may be used for helmets with or without a rim at the front of a helmet such as a PASGT Helmet. The size of the helmet may include, but are not limited to, extra small, small, medium, large, extra-large, etc.

The attachment device may include an over mold or shroud that covers the attachment device or may incorporate sloped edges. (See FIGS. 11, 15 and 16) There are many situations where the user may want the attachment device to have a smooth cover or edges. As a non-limiting example, a soldier may jump out of a plane with a parachute. As such, having sharp edges or protrusions may snag wires or the parachute itself. Therefore, an over mold may cover the attachment device and may provide a smooth surface so it does not snag any foreign objects.

The device may be segmented and circle the entire helmet.

Now that various embodiments of a cammed clamp have been described, it should be understood that one or more of such clamps in accordance with one of the embodiments described above may be used with or incorporated into various accessories for attaching those accessories to a helmet. A few non-limiting examples of uses of such clamps is provided below.

Figure 11:
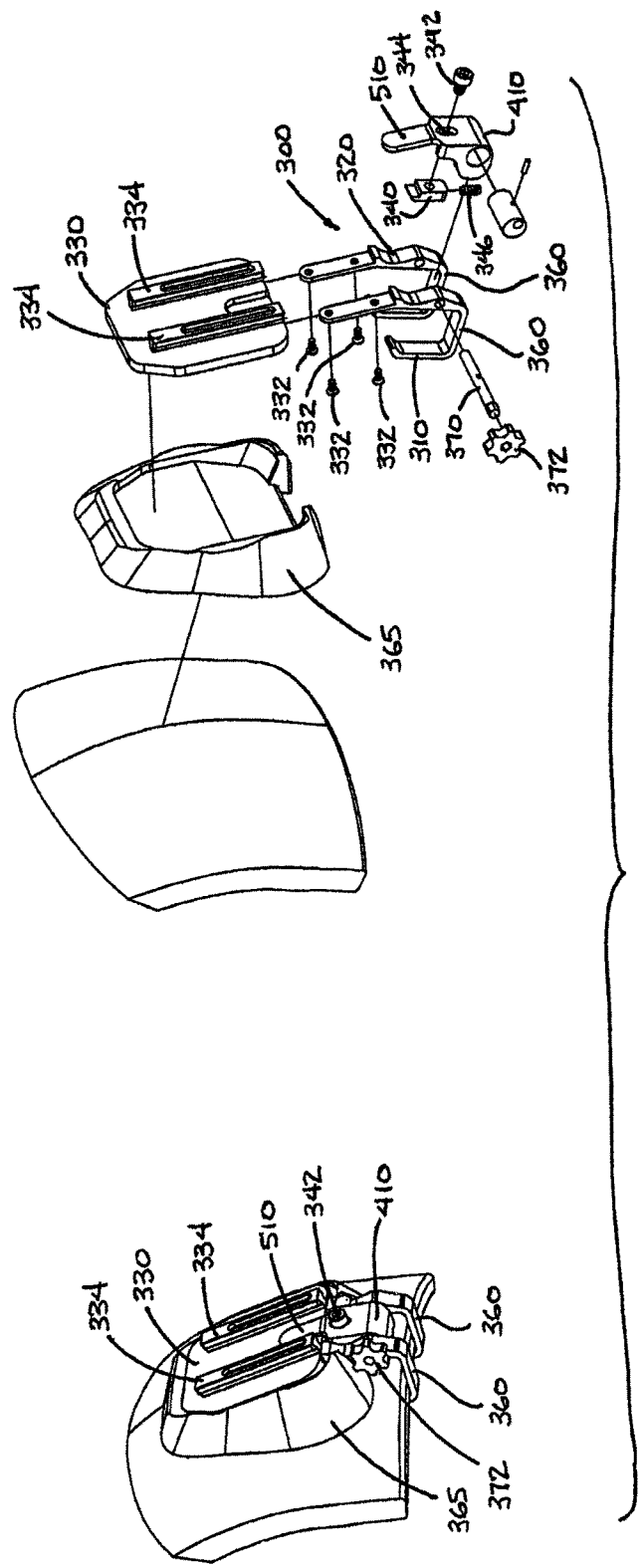
FIG. 11 is perspective views of another embodiment of the helmet attachment device, one view of the device in place on a helmet and the other view exploded.

Now referring to FIG. 11, front perspective views, both assembled and disassembled, of another embodiment of a helmet attachment device are shown. An attachment device 300 may include a first clamp 310 including a "u" shaped lower section 360 for receiving a portion of the helmet, wherein the first clamp may include an exterior. A second clamp 320 may include a "u" shaped lower section 360 for receiving a portion of the helmet, wherein the second clamp may include an exterior. The first clamp and the second clamp may then be combined with a mounting structure 330 to form a single unit. In this embodiment, the single unit is formed by attaching each of the clamps with screws 332 to the back of a mounting plate for use with night vision goggles. The front of the plate has vertically oriented "T" tracks 334 projecting from it to receive a helmet mount for night vision goggles. The "T" tracks can be used in the vertical adjustment aspect of the helmet mount.

Cams 410 may be pivotally mounted between the first clamp and the second clamp for movement between a released and clamped position, respectively to disengage and engage the attachment device to the helmet. The cam may be attached to an elongated handle 510, that extends outward to allow for the movement between released and clamped positions. The cam 410 (see FIG. 13) may have a rounded portion to contact the helmet along with back portions. In addition, there may be a shaft 370 that allows a pivot point for the cams. As such, when the handle is rotated around the axis, the back portions may gradually rotate to the rounded portions whereby a tight fit may be achieved with the helmet. As shown in FIG. 11, this embodiment incorporate a cam-within-a-cam means for adjusting the width of the clamping mouth. A knob 372 is provided at the end of shaft 370 to allow a user to adjust the width of the clamping mouth.

The cam handle may include a spring-loaded locking mechanism. A movable latch 340, attached to cam 410 by a screw 342 extending through an elongated slot 344 and normally biased upward by a coil spring 346 positioned between the latch and the cam body, may be adapted to unlock and lock the cam handle. The user may place the first and second clamps on to the helmet. Then, the user may rotate the cam handle until the cam is rotated and a tight fit with the helmet is achieved. The latch may be engaged so that it may lock the cam handle into place. Once the latch is engaged, the latch may be locked by tightening screw 342 and it may secure the attachment device to the helmet. Spring 346 may be operatively attached for the movable latch to bias the latch toward the locked position. The upper back surface of the latch may be sloped to allow the latch to snap into place as the cam is rotated into position. Hand pressure may then be used to counteract the spring and unlock the cam handle. Lock screw 342 may be used to secure the movable latch. This lock may prevent the unintentional release of the latch and may prevent the cam handle from unlocking. If the user desires to remove the attachment device from the helmet, then the user may unscrew the lock screw and use the latch to unlock the single unit. A release mechanism may allow for the release of the movable latch. As such, the spring may provide the resistance for the latch to disengage and engage. When the user desires to release the attachment device from the helmet, then the user may move the latch, thereby disengaging the latch and allowing the release mechanism to release the movable latch.

Mounting plate 330 may be removably attached, respectively, to the exterior section of the first clamp and to the exterior section of the second clamp. As a non-limiting example, the exteriors of the first and second clamp may be screwed to the back of the mounting plate. As such, the mounting plate may be securely attached to the attachment device. As non-limiting examples, the mounting plate may attach night vision goggles, lights, flags, infrared lights, safety tethers, etc. This will be further illustrated when describing FIGS. 17A-F.

In addition, the attachment device 300 may have a sloped side or cowl 365. The sloped side may surround the mounting plate. It could be or have a smooth outer surface that deflects out foreign bodies. As such, the sloped side may direct things up and over and may prevent (or substantially decrease) foreign objects from snagging or otherwise interfering with the operation of the attachment device. The cowl may be configured to rest behind the mounting plate between it and the helmet.

Now referring to FIG. 12, a side view of the helmet attachment device illustrated in FIG. 11 is shown. The cam 410 is shown with its rounded surface pressed against the outer surface of the helmet.

Now referring to FIG. 13, cross sectional side views of the embodiment of the helmet attachment device illustrated in FIG. 11 are shown. The left view shows the attachment device as it is being placed on the helmet with the cam in the down and open position. Also the mounting plate rests on a lower plane of the cowl. The right view shows the attachment device after the cam has been pivoted up to the closed position. The mounting plate now rests on an upper plane of the cowl pressing it against the helmet. The latch 510 is also shown snapped into its locked position.

Now referring to FIG. 14, a back perspective view of the helmet attachment device illustrated in FIG. 11, attached to a helmet is shown. The attachment device is placed on the helmet, with the inner arms of the clamps engaged with the inside of the helmet.

The embodiments of the attachment device described in FIGS. 11-14, may be used in several ways. The attachment device may have single unit 330. The first and second clamps may be placed on the helmet when the latch 340 is unlocked. Then the cam may be engaged by rotating the handle 510 whereby locking the single unit and engaging the latch. When the user desires to unlock the single unit, the user may move the latch to release the latch and rotate the handle the other way. The mounting plate 350 may be used hold different accessories such as night vision goggles or battery packs.

With reference to FIG. 14A, a series of perspective views of the attachment device of FIG. 11 are shown. The device is placed on a helmet. Then a user may lower a helmet mount 520 for night vision goggles down onto the vertically oriented "T" tracks. Mount 520 may have openings that mate with the "T" tracks and allow for vertical adjustment of the helmet mount once it is in place on the "T" tracks.

Now referring to FIG. 15, perspective views of another embodiment of the helmet attachment device are shown. An attachment device may include a first clamp 710 forming a "u" shaped lower section 730 for receiving a portion of the helmet. The first clamp may include an exterior. A second clamp 720 may also include a "u" shaped lower section 730 for receiving a portion of the helmet. The second clamp may include an exterior. A cam 740 may be pivotally mounted between the first clamp and the second clamp for movement between a released and clamped position to respectively disengage and engage the attachment device to the helmet. In addition, there may be a shaft 770 that allows a pivot point for the cam. As such, when the cam is rotated around the axis, the back portion may gradually rotate to the rounded portion whereby a tight fit may be achieved with the helmet.

A mounting plate 760 may be removably attached, respectively, to the exterior section of the first clamp and to the exterior section of the second clamp. As a non-limiting example, the exteriors of the first and second clamp may be screwed to the back of the mounting plate. As such, this may securely hold the mounting plate to the attachment device.

The attachment device may have several features that allows the cam to interact with the shaft. As seen in FIG. 15, the device is depicted as including a cam-within-a-cam means for adjusting the width of the clamp mouths. A knob or handle 772 may be mounted at one end of the shaft 770 to allow a user to adjust the width of the clamp mouths. This attachment device also has a spring-biased latch that operates in a similar manner to that described above for the embodiment of FIG. 11.

However, the axis of the cam may be eccentric (see FIG. 8). The axis of the cam may be located off-center and at a different quadrant than the center. The distance from the pivot point and which quadrant the axis is located on the cam surface may result in greater variability in the securement of the attachment device to the helmet.

Moreover, the cams may have rounded portions along with a back section. When the cams are rotated around the axis, the back section may gradually rotate to the rounded portions whereby a tight fit may be achieved with the helmet. The cam surface may also have a flat section (see FIG. 1D) so that the cam will tend to seat or lock in place when rotated to the position where the flat section rests against the surface of the helmet.

Further, the cam may have a polygonal shaped shaft. The cam shaft may have a central segment that has a cross section that is an octagon, a decagon, a hexagon, or any other shape that may be beneficial. The shaft shape may allow a cam to be rotated relative to its position on the shaft such that the distance from the pivot point to the cam surface is adjusted for a given positioning of the cam. These features may be used in conjunction with each other to achieve a desired effect. The one side handle may go through the shaft, which may be connected to the internal part of the shaft.

The attachment device is similarly used as described for FIGS. 11-14. It may also be modified to incorporate further features discussed above for other embodiments.

Now referring to FIG. 16, a plan front view of another embodiment of the helmet attachment device is shown. This embodiment may be used to retrofit an existing mechanism. As a non-limiting example, a shroud may be the existing mechanism. The attachment device may be used with the existing mechanism. As such, holes do not need to be drilled into the helmet.

An attachment device may include a "u" shaped lower section for receiving a portion of the helmet, wherein the first clamp 810 may include an exterior. A second clamp 820 may include a "u" shaped lower section for receiving a portion of the helmet. The second clamp may include an exterior section. A first cam 830 may be pivotally mounted to the first clamp for movement between a released and clamped position to respectively disengage and engage the attachment device to the helmet. A second cam 840 may be pivotally mounted to the second cramp for movement between a released and clamped position to respectively disengage and engage the attachment device to the helmet. The cams may have a single handle each. Depending on the shape of the shroud, the handle may be angled to avoid any protrusions or for design purposes.

A shroud may be removably attached, respectively, to the exterior section of the first clamp and to the exterior section of the second clamp. The holes in the shroud 850 may be used as a receptacle to receive a bolt or a screw to secure the shroud to the attachment devices. The shroud may have a designated section where a mounting plate may be affixed.

Furthermore, the attachment device may be used to retrofit existing shrouds or brackets. The attachment device may be incorporated into the existing Shroud-Light and all existing shrouds and brackets that attach to helmets with holes and hardware or straps and clips. As non-limiting example, an attachment device may be attached to an existing shroud. The aperture of the attachment device 150 may be screwed into the hole of the shroud 850 and would thereby secure the attachment device to the shroud. A second attachment device may be attached to the other side of the shroud as previously described for the first attachment device. Then, the attachment devices may be disengaged and placed on the helmet. Once both attachment devices have been placed on the helmet, they may both be engaged and secured to the helmet. As such, the attachment device may be used to retrofit existing shrouds and brackets to a helmet without the need for drilling holes in the helmet.

Now referring to FIG. 16A, back plan views of the device illustrated in FIG. 16 are shown. In an embodiment, a gasket 870 may line the shroud. As a non-limiting example, the gasket may be a material such as rubber or some sort of polymer. The gasket may assist in gripping the helmet surface. An additional method of assisting in the gripping of the helmet surface may include the use of VELCRO or hook and loop fasteners 880. In an embodiment, the back of the shroud may include the hook fasteners and the corresponding surface of the helmet may include loop fasteners. In another embodiment, the back of the shroud may include the loop fasteners and the corresponding surface of the helmet may include hook fasteners. These fasteners are available on a sheet that can be cut to size and with a pressure sensitive adhesive backing covered by a release liner. The user may remove the release liners and then attach the hook fasteners to either the helmet or shroud surface and attach the loop fasteners to the other surface. Other suitable methods may be used to attach the fasteners in place. The user may then align the shroud to the helmet and press the shroud to helmet to engage the hook and loop fasteners, thereby attaching the shroud to the helmet. The use of VELCRO may be used in conjunction with the features described in the section describing FIG. 16 or it may be used independently.

A Universal Shroud may be adapted as the Shroud-Light to have an integrated battery pack that drives/operates one or several individual attached devices containing integrated light(s), IR light, or other visual or signaling capability for purposes already described above, such as friend or foe signaling or the like (see FIG. 17A).

Now referring to FIGS. 17A-F, a front plan view and perspective views of the helmet attachment device showing the attachment of accessories are shown. The attachment device may attach a battery or battery pack, a flag, antenna, infrared light, detection light, safety tether, night vision goggle, or any other accessory.

With reference to FIG. 17A, a front plan view is shown of a helmet shroud 900 for receiving a helmet mount for night vision goggles. This helmet shroud incorporates lights and has a built-in battery pack 902 at the lower center of the shroud. Below the battery pack is an attachment device according to one embodiment of the present invention. This attachment device has a pair of clamps 904 and a pair of cams 906. The cams are oriented in a horizontal position.

FIG. 17B shows a pair of perspective views, assembled and disassembled, of one embodiment of an attachment device that could be used in FIG. 17A. This attachment device has four screws 908 for securing the attachment device to the back of the helmet shroud. As noted, the cams are oriented in a horizontal position to rotate about shafts 910. The inner arm of the clamps have openings 912 to receive resilient plugs 914. Resilient plugs 914 may be made of rubber or another appropriate resilient material and when in place face inward toward the inner surface of the helmet. Plugs 914 help take up any gap in the fit of the clamps to the helmet and can help improve the attachment. Plugs 914 can be pulled from the openings to be removed if they are not needed. Also, alternate pugs of varying thickness may be provided so that plugs appropriate for the helmet to fit the clamps to may be selected. In the embodiment of FIG. 17B the helmet contact point for a cam is offset from the helmet contact point for its corresponding clamp. With a single cam/clamp attachment this could cause the attachment to skew or twist. However, by pairing one cam/clamp attachment that would tend to twist in one direction with a second cam/clamp attachment that would tend to twist in the other direction a balanced attachment may be achieved.

With reference to FIG. 17C, a pair of perspective views, both assembled and disassembled, of an alternative embodiment of an attachment device that could be used in FIG. 17A is shown. In this alternative embodiment, a cam-within-a-cam mechanism is used to pivotally attach the cams to the clamps. Driving heads 916 attached to one end of the shafts may then be used by a user to adjust the width of the clamp mouths. The driving heads are preferably attached to the lower end of the shafts so as to face downward for easier access by a user. The driving heads are shown with a slotted interface for use with a tool. However, it should be understood that other interfaces may also be used. Moreover, mechanisms that would allow for adjustment without the use of tools like those discussed above could also be adopted.

FIG. 17D shows a perspective view an alternative helmet shroud that may be mounted to a helmet using an attachment device according to the present invention. This embodiment use horizontally oriented cams. However, this embodiment does not have a built-in battery pack. Rather, it has a separate battery back attached to the shroud by a power cable. Thus, the separate battery pack may also be attached to the helmet at a different location along the brim of the helmet. In this embodiment, a similar system employing horizontal cams is also used to attach the battery pack to the helmet.

FIG. 17E shows a perspective view with a helmet shroud and attachment device similar to that of FIG. 15 being used to attach the shroud to a helmet. However, this shroud incorporates lights and requires a battery back. In this embodiment, the battery pack is separate and connected to the shroud by a power cable. The battery pack is attached to the helmet at a different point along the brim of the helmet and uses an attachment device with horizontally oriented cams.

FIG. 17F shows a perspective view of a stand-alone battery pack to be attached to a helmet. The attachment device for use with the battery pack is shown disassembled from the battery pack. The attachment device is similar to those described above using horizontally oriented cams. The attachment device may be attached to the inner surface of the battery pack using screws 918.

Other embodiments of the present invention allow for secure attachment of accessories to a helmet with the use of straps. Thus, in addition to the benefits previously discussed, the use of a strap may further secure and stabilize the attachment of accessories to a helmet.

Figure 18:
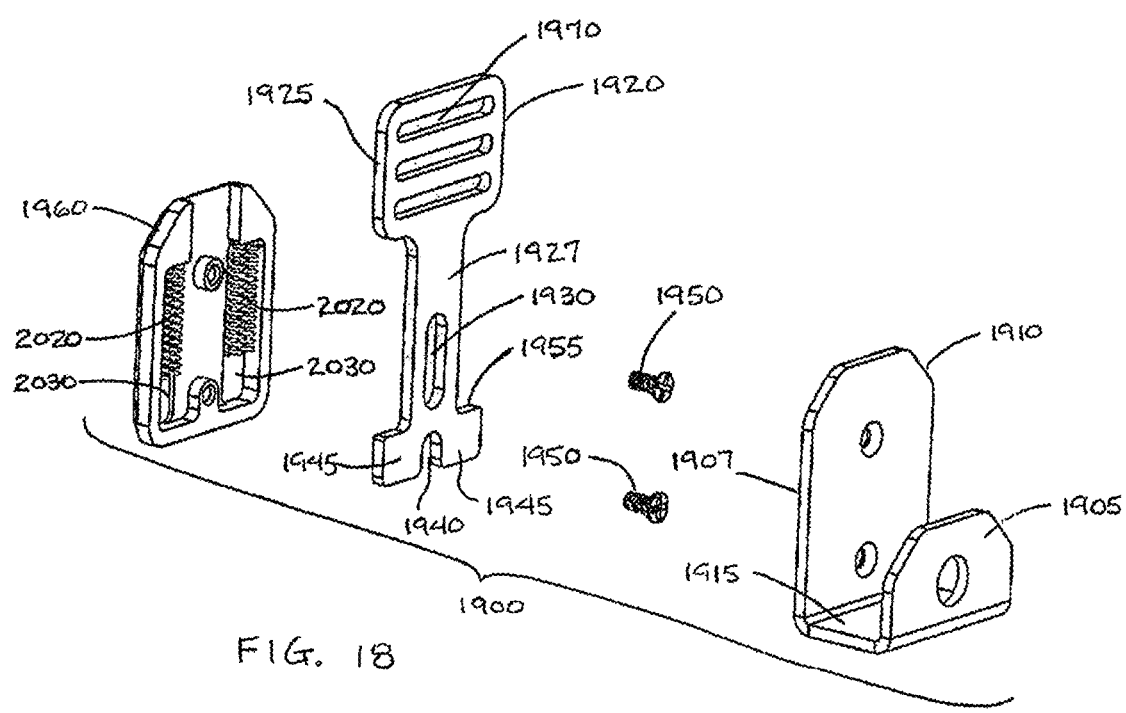
FIG. 18 is an exploded view of a clamp attachment device.

Now referring to FIG. 18, a perspective view is shown of a spring-loaded anchoring device 1900. An anchoring device for a helmet may include a clamp 1910, a tensioner or biasing element 2020, an elongated member 1920, a strap 2120 (see FIG. 19), and/or a cover 1960.

In one or more embodiments, the clamp may be "u" shaped. The clamp may include a "u" shaped lower section 1915 for receiving a portion of the helmet. Moreover, the "u" shape may have a longer external arm than the internal arm. The clamp may include an exterior section 1907 intended to be outside the helmet with the exterior of the cover exposed. The exterior section may have an outer facing region of the longer arm of the "u" shape of the clamp. There may be a shorter arm 1905 of the clamp. The shorter arm may have an opening. Thus, the clamp may look like a fishing hook in shape. As a non-limiting example, the clamp may have more than one inward facing shorter arm.

An elongated member may be slidably attached to the clamp for movement between a raised and lowered position. A cover 1960 may be attached to the outer facing region of the longer external arm of the clamp, with the elongated member in between, by the use of screws 1950.

The elongated member may be a long, flat member with a top end 1925 and bottom end 1955 along with a narrow body 1927 extending in between. Moreover, the elongated member at the bottom end may have two feet 1945 that protrude horizontally.

Figure 19:
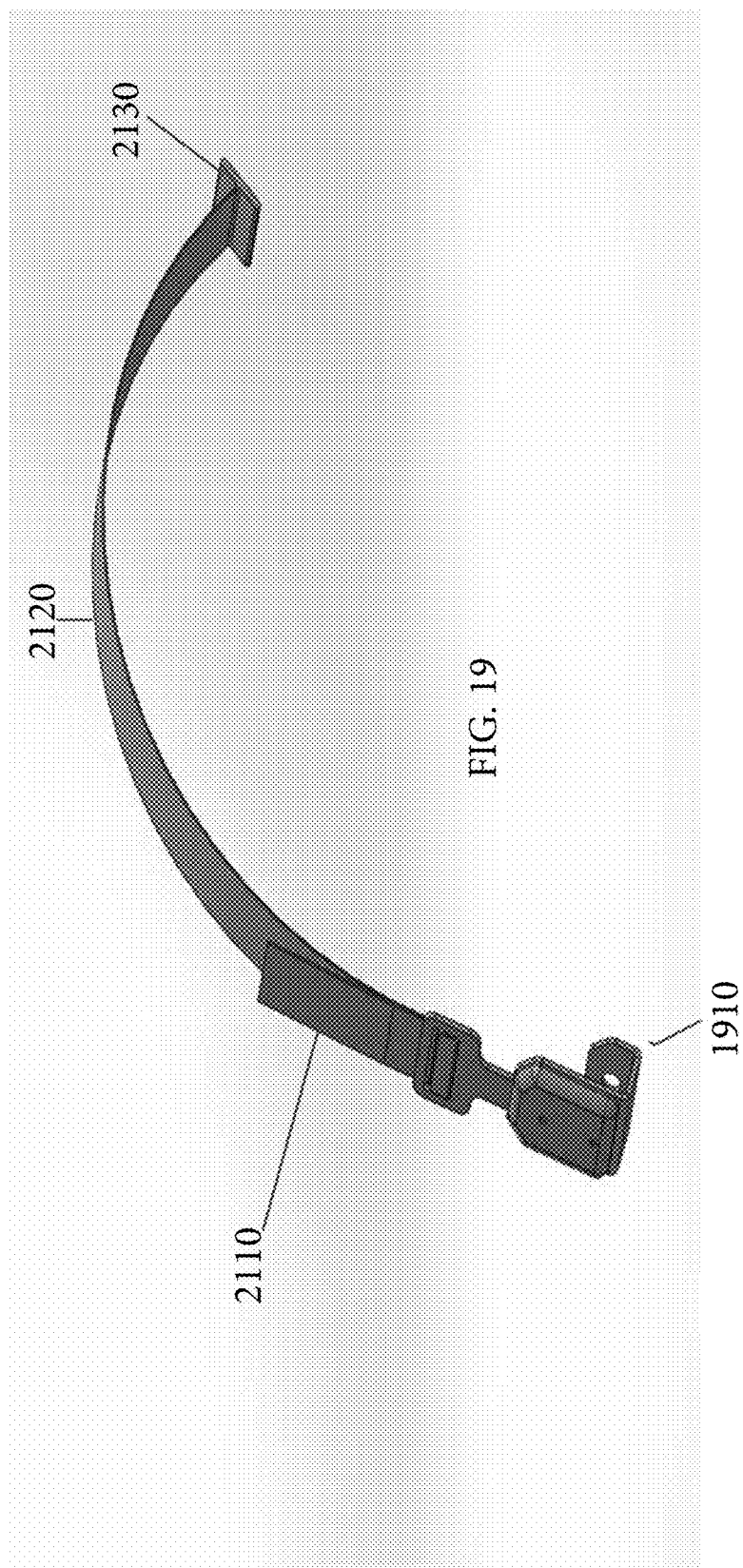
FIG. 19 is a perspective view of the clamp attachment device of FIG. 18 with a strap.

The elongated member may have one or more slots or grooves 1970 to thread and secure a strap 2120 (see FIG. 19). As a non-limiting example, there may be three parallel orthogonally horizontal slot openings. This allows a strap to be threaded through the slots and frictionally lock against itself to be held in place.

The narrow body may have an elongated opening 1930 to allow the elongated member to move up and down to a predetermined distance when a screw is attached to the cover. Another screw may be located at the bottom of the cover so that when the elongated member moves down, the screw may act as a stopping mechanism. There may be a slot 1940 between the feet located at the bottom end of the elongated member to accommodate the screw. A tensioner or biasing means 2020 may be housed within the cover and may provide resistance to the sliding mount. The tensioner may include springs. As a non-limiting example, the cover may have two wells 2030 located within the cover. The first well may be located at the far left side and the other well may be located at the far right side, with both extending vertically along their, sides. The springs may be positioned within and/or attached to the top of the wells. The feet of the elongated member may fit into the bottom of the wells with the springs located above the top of the feet. Because the feet protrude to the side and are wider than the narrow body, the feet would capture or engage the springs when pulled up while the narrow body would move without a barrier. Further, the feet may be prevented from moving farther upward because the top of the wells may stop the feet. As such, when the tensioner is in the resting state, the resistance may be little to non-existent. However, when the elongated member is pulled upward, the tensioner may provide resistance and tend to push the elongated member downward. This spring loads any strap attached to the top of the elongated member helping to take up any slack that develops.

The cover may have a smooth outer surface. This may prevent the anchoring device from snagging on objects. Moreover, the cover may have two threaded receptacles. The first receptacle may be located in the middle or just above the middle. The second receptacle may be located at the bottom of the cover. Both receptacles may receive the screws.

Now referring to FIG. 19 is a perspective view of the anchoring device with a strap 2120. The strap may be attached to the elongated member of the spring-loaded clamp on one end, and attached to a shroud at the other end.

The strap may include a fishtail 2130, wherein the fishtail is folded and inserted into a slot of the shroud 855 (see FIG. 16), wherein the fishtail opens up and locks against the inside of the shroud.

The fishtail 2130, when folded parallel to the strap 2120, may slide through the slot in the shroud 855 (see FIG. 16) and may open up once it is through the slot. Furthermore, the fishtail may lock against the inside of the shroud when the strap experiences tension. At the other end of the strap, the strap may be feed through the grooves. Thus, a user can tighten the strap against the spring force. If any loosening occurs during use, the tensioner helps to take up the slack and keep the strap snug.

To operate the anchoring device, the user may place the clamp at the back of the helmet. The user then threads the strap through the groove on the elongated member. The elongated member at the top end may have three parallel orthogonally horizontal openings. To allow for the strap to be threaded through the opening, the opening may be wider than the strap. The user may thread the strap behind the groove at the lowest opening and, in through the middle opening. Then the user threads the strap out through the top opening. The user then pulls on the strap at the loose end 2110, adjusts it to a desired length, and pulls on the strap to tighten it. Friction and the way the strap is threaded through the openings may lock the strap in place. To release the tension in the strap, the user may lift the strap between the middle and top opening to loosen it.

The tensioner may provide constant preset tension to the strap attached to the shroud. This may assist in a tight fit with the helmet regardless of the size of the helmet being used. Also, the use of the anchoring device with the attachment device on the shroud may further stabilize the shroud and prevent the shroud from wobbling. In addition, hook and loop fasteners may be used to manage the loose tail of the strap after tightening.

Furthermore, the anchoring device may be used with the attachment device 100. As such, the attachment device may be attached to the helmet in the front as described earlier. Then the user may attach a strap to the attachment device at one end and the strap may be connected to the anchoring device at the other end. Once the user threads the groove of the elongated member and pulls on the strap, a constant pressure may be provided. In addition to the strength of attachment of the attachment device, the anchoring device may provide further stability to prevent the attachment device from wobbling. As a non-limiting example, the anchoring device may be used with several attachment devices, different embodiments of the attachment devices, accessories, shrouds, or any other mechanism that may need more stabilization.

In addition, a method of attaching an attachment device for a helmet is described.

Embodiments of the present invention provide simplified installation of a shroud, plate or other accessories for attachment to a helmet. The simplified installation of the attachment device does not compromise in the integrity or the strength of the helmet because it does not require use of drilled holes in the helmet to secure the accessories via the use of screws. In addition, embodiments of the present invention securely attach the accessories to the helmet.

In addition, embodiments of the present invention allow for secure attachment of accessories to a helmet without the need for use of any tools. Thus, accessories may be quickly and easily attached to or removed from a helmet by hand. This greatly simplifies the process of attaching accessories to a helmet.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claim and its equivalents.

What is claimed is:

1. An attachment device for a helmet, the attachment device comprising:
   a clamp comprising an exterior section, an interior section, and a lower section joining the exterior section to the interior section; and
   a cam pivotally mounted to the clamp for movement between a released and clamped position to respectively disengage and engage the attachment device to the helmet,
   wherein at least one of the exterior section and the interior section of the clamp comprises an inwardly facing protrusion extending towards a position between the exterior section and the interior section for contacting the helmet,
   wherein the cam is located on the other of the exterior section and the interior section,
   wherein the exterior section is translatable relative to the interior section for adjusting a distance between the exterior section and the interior section,
   wherein the lower section of the clamp comprises a first segment extending from the exterior section, and a second segment extending from the interior section, and
   wherein the first segment and second segment of the lower section are connectable at a plurality of locations to adjust the distance between the exterior section and the interior section.

2. An attachment device for a helmet, the attachment device comprising:
   a clamp comprising an exterior section, an interior section, and a lower section joining the exterior section to the interior section; and
   a cam pivotally mounted to the clamp for movement between a released and clamped position to respectively disengage and engage the attachment device to the helmet,
   wherein at least one of the exterior section and the interior section of the clamp comprises an inwardly facing protrusion extending towards a position between the exterior section and the interior section for contacting the helmet,
   wherein the cam is located on the other of the exterior section and the interior section,
   further comprising a plurality of cams having different sizes,
   wherein the clamp comprises a pivot axis for movement between the released and clamped positions, and
   wherein in a first configuration, the pivot axis of the clamp is selectively coupled to a first cam of the plurality of cams, and in a second configuration, the pivot axis is selectively coupled to a second cam of the plurality of cams, and when selectively coupled to either the first cam or the second cam, the coupled cam is removable from the clamp.

3. The attachment device of claim 2, wherein the clamp is flexible for compression to the helmet to ensure a secure fit.

4. The attachment device of claim 2, wherein each of the plurality of cams further comprises a surface for contacting the helmet, wherein the surface comprises a conforming material.

5. The attachment device of claim 2, wherein in the clamped position, the coupled cam of the plurality of cams contacts the helmet at a first position and the protrusion is located above the first position relative to the lower section of the clamp.

6. The attachment device of claim 2, wherein each of the plurality of cams further comprises a surface for contacting the helmet, the surface having a flat section that contacts the helmet in the clamped position.

7. The attachment device of claim 2, wherein at least one of the exterior section and interior section of the clamp comprises a lock for maintaining the attachment device in the clamped position such that the attachment device is prevented from moving into the released position.

8. The attachment device of claim 2, further comprising an over mold wherein the over mold covers edges of the attachment device.

9. An attachment device for a helmet, the attachment device comprising:
   a clamp comprising an exterior section, an interior section, and a lower section joining the exterior section to the interior section; and
   a cam pivotally mounted to the clamp for movement between a released and clamped position to respectively disengage and engage the attachment device to the helmet,
   wherein at least one of the exterior section and the interior section of the clamp comprises an inwardly facing protrusion extending towards a position between the exterior section and the interior section for contacting the helmet,
   wherein the cam is located on the other of the exterior section and the interior section,
   further comprising a pull ring for coupling the cam to the clamp, the pull ring having a movable protrusion that is movable when the cam and clamp are coupled for decoupling the cam from the clamp.

* * * * *